US012126097B2

(12) United States Patent
Yoshikawa et al.

(10) Patent No.: US 12,126,097 B2
(45) Date of Patent: Oct. 22, 2024

(54) ANTENNA, WIRELESS COMMUNICATION MODULE, AND WIRELESS COMMUNICATION DEVICE

(71) Applicant: KYOCERA CORPORATION, Kyoto (JP)

(72) Inventors: Hiromichi Yoshikawa, Yokohama (JP); Satoshi Ishikawa, Chofu (JP)

(73) Assignee: KYOCERA CORPORATION, Kyoto (JP)

( * ) Notice: Subject to any disclaimer, the term of this patent is extended or adjusted under 35 U.S.C. 154(b) by 167 days.

(21) Appl. No.: 17/785,907

(22) PCT Filed: Dec. 21, 2020

(86) PCT No.: PCT/JP2020/047650
§ 371 (c)(1),
(2) Date: Jun. 16, 2022

(87) PCT Pub. No.: WO2021/132143
PCT Pub. Date: Jul. 1, 2021

(65) Prior Publication Data

US 2023/0021498 A1 Jan. 26, 2023

(30) Foreign Application Priority Data

Dec. 24, 2019 (JP) ................................. 2019-233265

(51) Int. Cl.
*H01Q 9/04* (2006.01)
*H01Q 1/24* (2006.01)
(Continued)

(52) U.S. Cl.
CPC ............. *H01Q 9/0407* (2013.01); *H01Q 1/24* (2013.01); *H01Q 5/10* (2015.01); *H01Q 5/378* (2015.01)

(58) Field of Classification Search
CPC H01Q 1/38; H01Q 1/40; H01Q 5/378; H01Q 9/0407; H01Q 9/0414
See application file for complete search history.

(56) References Cited

U.S. PATENT DOCUMENTS 7,236,130 B2 * 6/2007 Voigtlaender ............ H01Q 1/52 343/793
8,253,640 B2 8/2012 Kitayoshi et al.
(Continued)

FOREIGN PATENT DOCUMENTS

JP 200866808 A 3/2008
JP 2012119410 A 6/2012
(Continued)

*Primary Examiner* — Dameon E Levi
*Assistant Examiner* — Leah Rosenberg
(74) *Attorney, Agent, or Firm* — HAUPTMAN HAM, LLP

(57) ABSTRACT

To provide a novel antenna, wireless communication module, and wireless communication device excellent in long-term reliability. The antenna includes a first conductor, a second conductor facing the first conductor in a first direction, a third conductor, a fourth conductor, a power supply line configured to be electromagnetically connected to the third conductor, and a reinforcing member including a dielectric material. The third conductor extends along the first direction, is located between the first conductor and the second conductor, and is configured to capacitively connect the first conductor and the second conductor. The fourth conductor extends along the first direction and is configured to be electrically connected to the first conductor and the second conductor. The reinforcing member is located on at least a portion of any of the first conductor and the second conductor.

13 Claims, 13 Drawing Sheets

(51) Int. Cl.
*H01Q 5/10* (2015.01)
*H01Q 5/378* (2015.01)

(56) References Cited

U.S. PATENT DOCUMENTS

| | | | | |
|---|---|---|---|---|
| 10,008,783 | B2 * | 6/2018 | Ueda | H01Q 9/0421 |
| 11,495,874 | B2 * | 11/2022 | Nemoto | H01Q 1/48 |
| 2019/0326678 | A1 * | 10/2019 | Uchimura | H01Q 9/0414 |
| 2020/0227832 | A1 | 7/2020 | Nemoto et al. | |

FOREIGN PATENT DOCUMENTS

| | | | |
|---|---|---|---|
| WO | 2018174026 | A1 | 9/2018 |
| WO | 2019069546 | A1 | 4/2019 |

* cited by examiner

ANTENNA, WIRELESS COMMUNICATION MODULE, AND WIRELESS COMMUNICATION DEVICE

RELATED APPLICATIONS

The present application is a National Phase of International Application Number PCT/JP2020/047650, filed Dec. 21, 2020, and claims priority based on Japanese Patent Application No. 2019-233265, filed Dec. 24, 2019.

TECHNICAL FIELD

The present disclosure relates to an antenna, a wireless communication module, and a wireless communication device.

BACKGROUND ART

Conventionally, thin antennas having flexibility are known (for example, Patent Documents 1 and 2).

CITATION LIST

Patent Literature

Patent Document 1: JP 2008-66808 A
Patent Document 2: JP 2012-119410 A

SUMMARY OF INVENTION

Technical Problem

There has been a demand for improvements in stress relaxation for conventional antennas.

The present disclosure has an object to provide a novel antenna, wireless communication module, and wireless communication device excellent in terms of long-term reliability.

Solution to Problem

An antenna according to an embodiment of the present disclosure includes a first conductor, a second conductor facing the first conductor in a first direction, a third conductor, a fourth conductor, a power supply line configured to be electromagnetically connected to the third conductor, and a reinforcing member including a dielectric material. The third conductor extends along the first direction, is located between the first conductor and the second conductor, and is configured to capacitively connect the first conductor and the second conductor. The fourth conductor extends along the first direction and is configured to be electrically connected to the first conductor and the second conductor. The reinforcing member is located on at least a portion of any of the first conductor and the second conductor.

An antenna according to an embodiment of the present disclosure includes four radiation conductors, a fourth conductor, four conductor sets, a power supply line configured to electromagnetically connect to any of the four radiation conductors, and a reinforcing member including a dielectric material. The four radiation conductors extend along a second plane and are separate from each other in the first direction and a third direction included in the second plane. The fourth conductor extends along the second plane and is separated from the four radiation conductors in a second direction intersecting the second plane. Each of the four conductor sets includes at least one connection conductor extending along the second direction from the fourth conductor. The reinforcing member is located on at least a portion of any of the four conductor sets. The four conductor sets are configured to be electrically connected to the four radiation conductors, respectively. Among the connection conductors included in the four conductor sets, any two connection conductors are parts of a first connection pair aligned along the first direction, and any two connection conductors are parts of a second connection pair aligned along the third direction. The antenna is configured to resonate at a first frequency along a first current path including the fourth conductor, the four radiation conductors, and the first connection pair. The antenna is configured to resonate at a second frequency along a second current path including the fourth conductor, the four radiation conductors, and the second connection pair.

A wireless communication module according to an embodiment of the present disclosure includes the antenna described above, and a radio frequency (RF) module. The RF module is configured to be electrically connected to the power supply line.

A wireless communication device according to an embodiment of the present disclosure includes the wireless communication module described above, and a battery. The battery is configured to supply power to the wireless communication module.

Advantageous Effects of Invention

According to an embodiment of the present disclosure, a novel antenna, wireless communication module, and wireless communication device excellent in long-term reliability can be provided.

DESCRIPTION OF EMBODIMENTS

Figure 1:
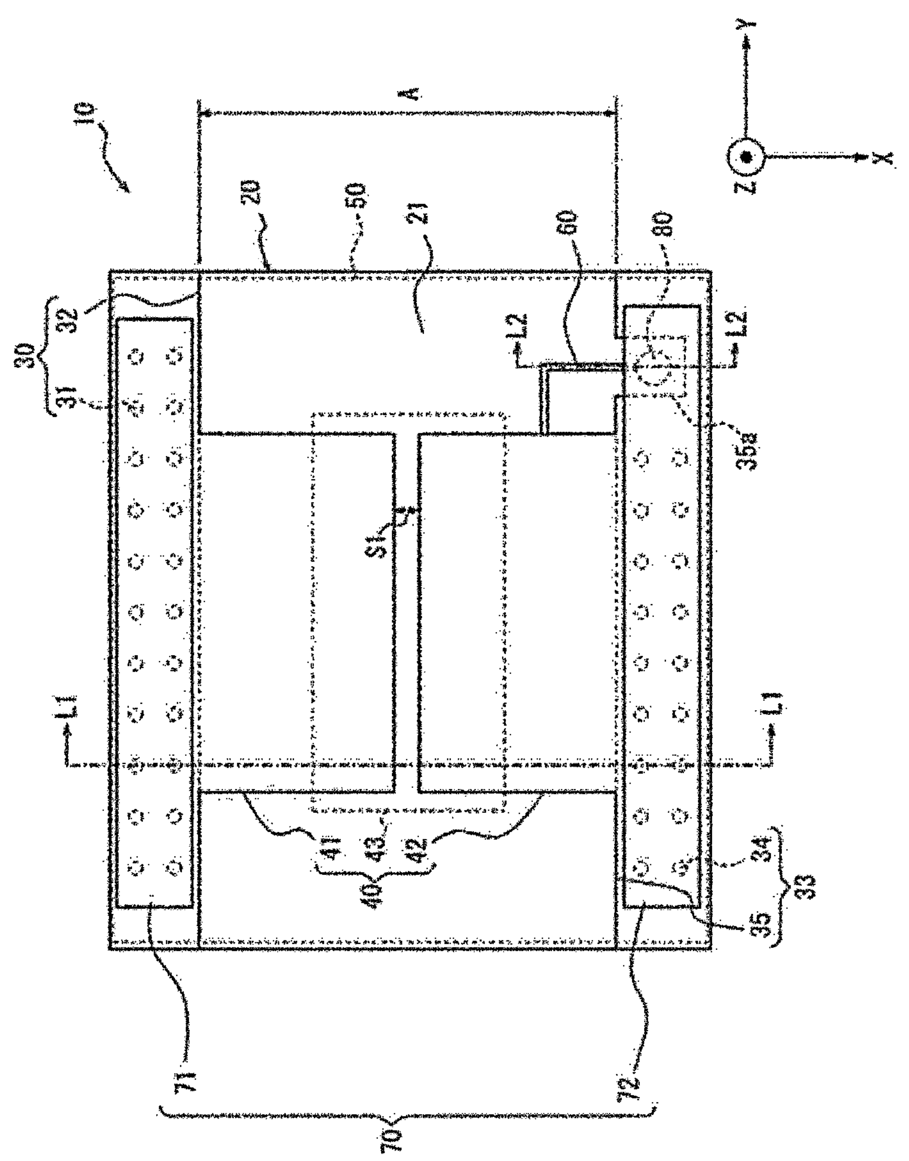
FIG. 1 is a plan view of an antenna according to an embodiment of the present disclosure.

In the present disclosure, "dielectric material" may include a composition of either a ceramic material or a resin material. Examples of the ceramic material include an aluminum oxide sintered body, an aluminum nitride sintered body, a mullite sintered body, a glass ceramic sintered body, crystallized glass yielded by precipitation of a crystal component in a glass base material, and a microcrystalline sintered body such as mica or aluminum titanate. Examples of the resin material include an epoxy resin, a polyester resin, a polyimide resin, a polyamide-imide resin, a polyetherimide resin, and resin materials yielded by curing an uncured liquid crystal polymer or the like.

The "electrically conductive material" in the present disclosure may include a composition of any of a metal material, an alloy of metal materials, a cured metal paste, and a conductive polymer. Examples of the metal material include copper, silver, palladium, gold, platinum, aluminum, chrome, nickel, cadmium lead, selenium, manganese, tin, vanadium, lithium, cobalt, and titanium. The alloy includes a plurality of metal materials. The metal paste includes the result of kneading a powder of a metal material with an organic solvent and a binder. Examples of the binder include an epoxy resin, a polyester resin, a polyimide resin, a polyamide-imide resin, and a polyetherimide resin. Examples of the conductive polymer include a polythiophene polymer, a polyacetylene polymer, a polyaniline polymer, and a polypyrrole polymer.

Embodiments of the present disclosure will be described below with reference to the drawings. The same components, among the components illustrated in FIGS. 1 to 13, are denoted by the same reference signs.

In embodiments of the present disclosure, an XYZ coordinate system is adopted. Hereinafter, in a case that an X-axis positive direction and an X-axis negative direction are not particularly distinguished, the X-axis positive direction and the X-axis negative direction are collectively referred to as an "X direction". In a case that a Y-axis positive direction and a Y-axis negative direction are not particularly distinguished, the Y-axis positive direction and the Y-axis negative direction are collectively referred to as a "Y direction". In a case that a Z-axis positive direction and a Z-axis negative direction are not particularly distinguished, the Z-axis positive direction and the Z-axis negative direction are collectively referred to as a "Z direction".

Hereinafter, a first direction represents the X direction. A second direction represents the Z direction. A third direction represents the Y direction. A first plane represents an XZ plane. A second plane represents an XY plane. However, the first direction and the second direction need not be orthogonal to each other. The first direction and the second direction only need to intersect. The third direction need not be orthogonal to the XZ plane represented as the first plane. The third direction only needs to intersect the first plane.

Figure 2:
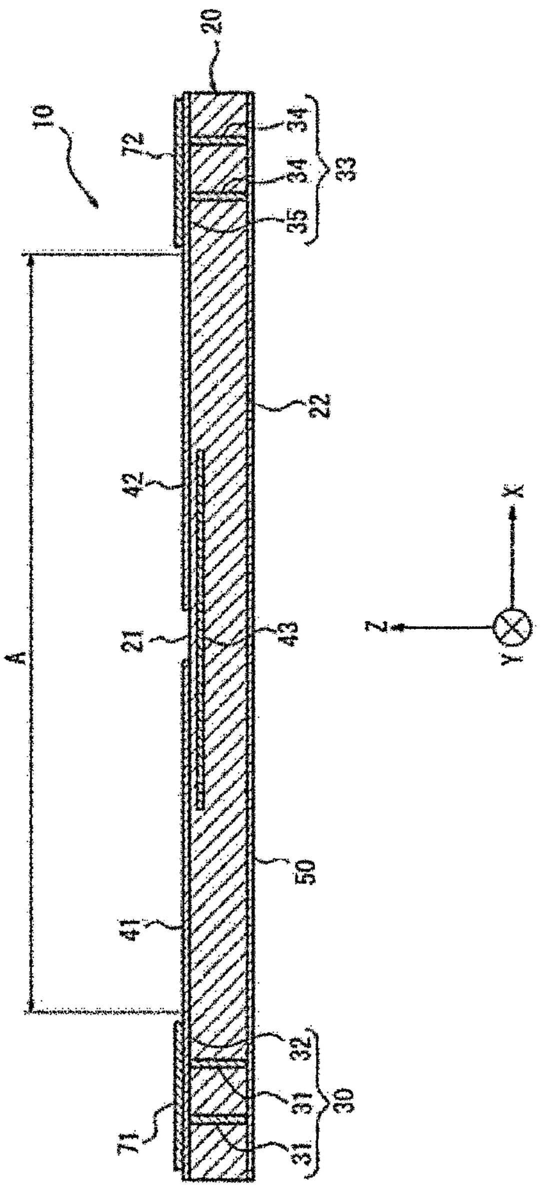
FIG. 2 is a cross-sectional view of the antenna taken along a line L1-L1 in FIG. 1.

FIG. 1 is a plan view of an antenna 10 according to an embodiment of the present disclosure. FIG. 2 is a cross-sectional view of the antenna 10 taken along a line L1-L1 in FIG. 1.

As illustrated in FIGS. 1 and 2, the antenna 10 includes a base 20, a first conductor 30, a second conductor 33, a third conductor 40, a fourth conductor 50, a power supply line 60, and a reinforcing member 70. The first conductor 30 and the second conductor 33 are also referred to as a conductor pair. The antenna 10 may further include a connecting part 80. Each of the first conductor 30, the second conductor 33, the third conductor 40, the fourth conductor 50, and the power supply line 60 includes an electrically conductive material. The first conductor 30, the second conductor 33, the third conductor 40, the fourth conductor 50, and the power supply line 60 may include the same electrically conductive material or may include different electrically conductive materials.

The antenna 10 may exhibit an artificial magnetic conductor character with respect to a predetermined frequency of electromagnetic waves externally incident on a plane where the third conductor 40 is located.

In the present disclosure, the "artificial magnetic conductor character" means a characteristic of a plane where a phase difference between an incident wave and a reflected wave at one resonant frequency is 0 degrees. The antenna 10 can have an operating frequency in the vicinity of at least one resonant frequency. On the plane having the artificial magnetic conductor character, the phase difference between the incident wave and the reflected wave at the operating frequency band is smaller than a range from −90 degrees to +90 degrees.

Figure 3:
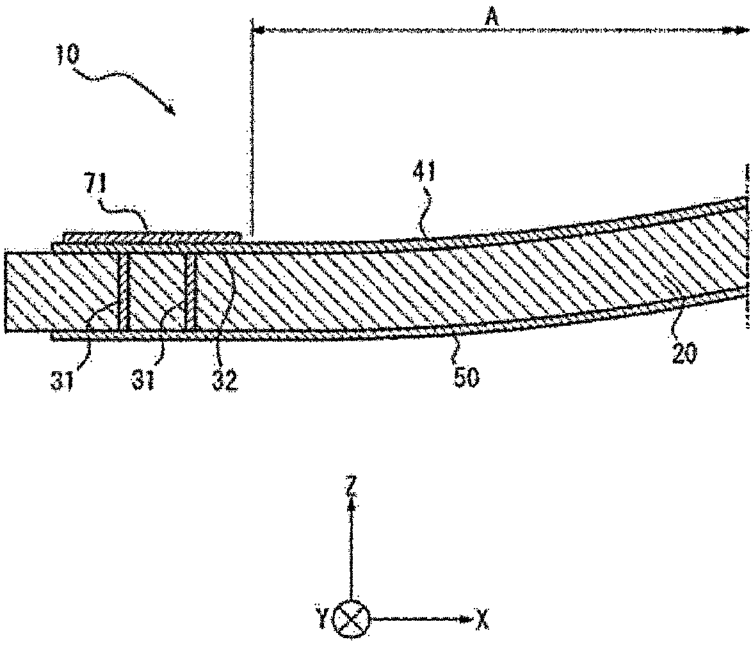
FIG. 3 is a diagram illustrating an example of a usage state of the antenna illustrated in FIG. 1.
Figure 4:
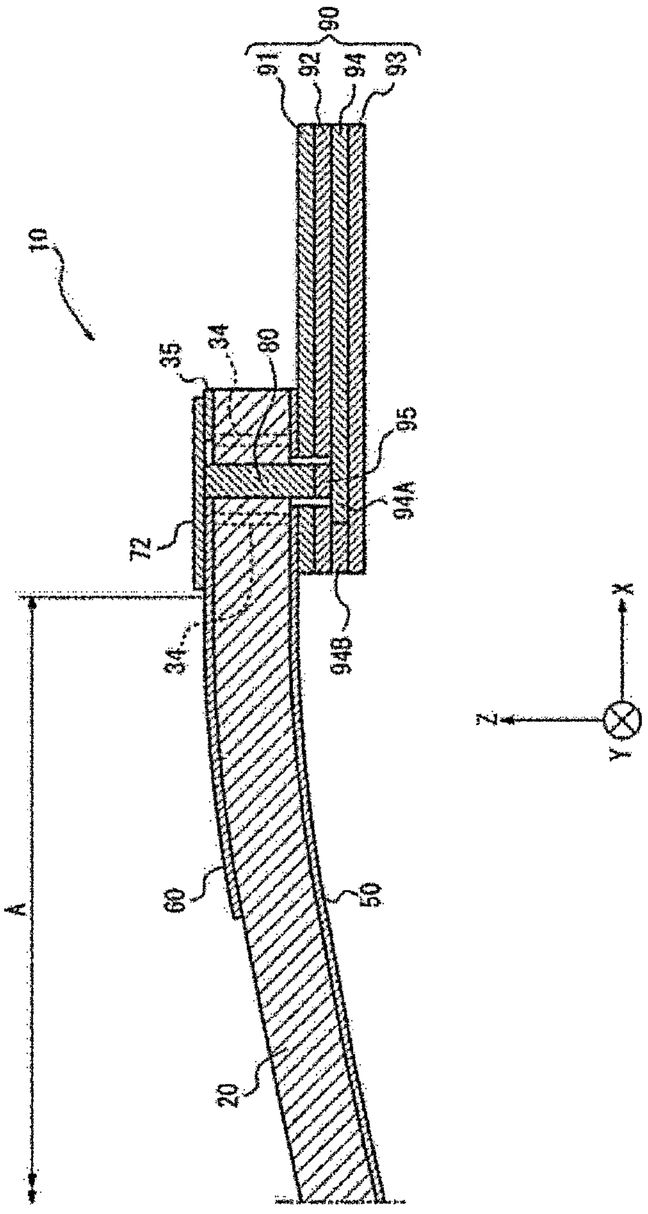
FIG. 4 is a diagram illustrating another example of the usage state of the antenna illustrated in FIG. 1.

At least a portion of the antenna 10 may be flexible. A region A of the antenna 10 may be bent in the X direction depending on the placement location and the like of the antenna 10. The region A is a partial region of the antenna 10 in the X direction. The region A may be a region including the third conductor 40. The region A may be a region not including the first conductor 30 or the second conductor 33. For example, the region A of the antenna 10 may be bent toward the Z-axis positive direction with respect to the X direction as illustrated in FIG. 3 described later, or may be bent toward the Z-axis negative direction as illustrated in FIG. 4 described later. The antenna 10 may be configured as a flexible printed circuit (FPC).

The base 20 includes a dielectric material. The base 20 may have any shape depending on a shape of the third conductor 40 and the like. The base 20 may have a substantially rectangular parallelepiped shape. A relative permittivity of the base 20 may be adjusted as appropriate depending on the desired operating frequency of the antenna 10. As illustrated in FIG. 2, the base 20 includes an upper surface 21 and a lower surface 22. The upper surface 21 is a surface on the Z-axis positive direction side, of two planes substantially parallel with the XY plane included in the base 20. The lower surface 22 is a surface on the Z-axis negative direction side, of two planes substantially parallel with the XY plane included in the base 20.

The first conductor 30 is positioned closer to the X-axis negative direction side than the second conductor 33. The first conductor 30 may be positioned at an end portion of the base 20 on the X-axis negative direction side. The first conductor 30 extends along the Y direction. The first conductor 30 includes at least one first connection conductor 31 and a first electrical conductor layer 32. The first connection conductor 31 and the first electrical conductor layer 32 may include the same electrically conductive material, or may include different electrically conductive materials.

As illustrated in FIG. 1, a plurality of first connection conductors 31 may be aligned at intervals in the Y direction. The plurality of first connection conductors 31 may be spaced apart at substantially equal intervals and aligned in the Y direction. The plurality of first connection conductors 31 may be aligned in two rows in the Y direction. However, the first connection conductor 31 may be aligned in one row in the Y direction, or may be aligned in three or more rows in the Y direction.

As illustrated in FIG. 2, the first connection conductor 31 extends along the Z direction from the fourth conductor 50 to the first electrical conductor layer 32. The first connection conductor 31 includes two end portions. The first connection conductor 31 may be configured to have one end portion electrically connected to the fourth conductor 50, and the other end portion electrically connected to the first electrical conductor layer 32. The first connection conductor 31 may be a through hole conductor, a via conductor, or the like.

The first electrical conductor layer 32 is located on the upper surface 21 of the base 20. The first electrical conductor layer 32 may be planar. The first electrical conductor layer 32 may be substantially rectangular. The first electrical conductor layer 32 includes two surfaces substantially parallel with the XY plane. One of those two surfaces faces the fourth conductor 50.

The first electrical conductor layer 32 is configured to be electrically connected to the third conductor 40. For example, the first electrical conductor layer 32 may be configured such that the surface facing the fourth conductor 50 of two surfaces substantially parallel with the XY plane of the first electrical conductor layer 32 is electrically connected to the end portion of the first connection conductor 31. For example, the first electrical conductor layer 32 may be configured such that a portion of an end portion of the first electrical conductor layer 32 on the X-axis positive direction side is electrically connected to a fifth conductor 41 (described later) of the third conductor 40.

The second conductor 33 faces the first conductor 30 in the X direction. The second conductor 33 is positioned closer to the X-axis positive direction side than the first conductor 30. The second conductor 33 may be positioned at an end portion of the base 20 on the X-axis positive direction side. The second conductor 33 extends along the Y direction. The second conductor 33 includes at least one second connection conductor 34 and a second electrical conductor layer 35. The second connection conductor 34 and the second electrical conductor layer 35 may include the same electrically conductive material, or may include different electrically conductive materials.

As illustrated in FIG. 1, a plurality of second connection conductors 34 may be aligned at intervals in the Y direction. The plurality of second connection conductors 34 may be spaced apart at substantially equal intervals and aligned in the Y direction. The plurality of second connection conductors 34 may be aligned in two rows in the Y direction. However, the second connection conductor 34 may be aligned in one row in the Y direction, or may be aligned in three or more rows in the Y direction.

As illustrated in FIG. 2, the second connection conductor 34 extends along the Z direction from the fourth conductor 50 to the second electrical conductor layer 35. The second connection conductor 34 includes two end portions. The second connection conductor 34 may be configured to have one end portion electrically connected to the fourth conductor 50, and the other end portion electrically connected to the second electrical conductor layer 35. The second connection conductor 34 may be a through hole conductor, a via conductor, or the like.

The second electrical conductor layer 35 is located on the upper surface 21 of the base 20. The second electrical conductor layer 35 may be planar. The second electrical conductor layer 35 may be substantially rectangular. The second electrical conductor layer 35 includes two surfaces substantially parallel with the XY plane. One of those two surfaces faces the fourth conductor 50. The second electrical conductor layer 35 may include an opening portion 35*a*. A portion of the connecting part 80 is located in the opening portion 35*a*.

The second electrical conductor layer 35 is configured to be electrically connected to the third conductor 40. For example, the second electrical conductor layer 35 may be configured such that the surface facing the fourth conductor of two surfaces substantially parallel with the XY plane of the second electrical conductor layer 35 is electrically connected to the end portion of the second connection conductor 34. For example, the second electrical conductor layer 35 may be configured such that a portion of an end portion of the second electrical conductor layer 35 on the X-axis negative direction side is electrically connected to a sixth conductor 42 (described later) of the third conductor 40.

The third conductor 40 extends along the X direction. The third conductor 40 may extend along the XY plane. The third conductor 40 is located between the first conductor 30 and the second conductor 33. The third conductor 40 includes the fifth conductor 41, the sixth conductor 42, and an inner conductor 43. The fifth connection conductor 41, the sixth conductor 42, and the inner conductor 43 may include the same electrically conductive material, or may include different electrically conductive materials.

The fifth conductor 41 and the sixth conductor 42 are located on the upper surface 21 of the base 20. A portion of the fifth conductor 41 and a portion of the sixth conductor 42 may be located inside the base 20. The fifth conductor 41 and the sixth conductor 42 may be substantially rectangular.

The fifth conductor 41 is configured to be electrically connected to the first electrical conductor layer 32 of the first conductor 30. For example, the fifth conductor 41 may be configured to have an end portion on the X-axis negative direction side that is electrically connected to the first electrical conductor layer 32. The end portion of the fifth conductor 41 on the X-axis negative direction side may be integrated with a portion of the end portion of the first electrical conductor layer 32.

The sixth conductor 42 is configured to be electrically connected to the second electrical conductor layer 35 of the second conductor 33. For example, the sixth conductor 42 may be configured to have an end portion on the X-axis positive direction side that is electrically connected to the second electrical conductor layer 35. The end portion of the sixth conductor 42 on the X-axis positive direction side may be integrated with a portion of the end portion of the first electrical conductor layer 32.

The end portion of the fifth conductor 41 on the X-axis positive direction side faces the end portion of the sixth conductor 42 on the X-axis negative direction side. A gap S1 is located between the end portion of the fifth conductor 41 on the X-axis positive direction side and the end portion of the sixth conductor 42 on the X-axis negative direction side. The fifth conductor 41 and the sixth conductor 42 may be capacitively connected to each other because the gap S1 is located between the end portion of the fifth conductor 41 on the X-axis positive direction side and the end portion of the sixth conductor 42 on the X-axis negative direction side. The width of the gap S1 in the X direction may be adjusted as appropriate depending on the desired operating frequency of the antenna 10.

As illustrated in FIG. 2, the inner conductor 43 is located inside the base 20. The inner conductor 43 is not electrically connected to the fifth conductor 41 or the sixth conductor 42. The inner conductor 43 is positioned closer to the Z-axis negative direction side than the fifth conductor 41 and the sixth conductor 42. As illustrated in FIG. 1, the inner conductor 43 may be substantially rectangular.

The inner conductor 43 is configured to capacitively connect the fifth conductor 41 to the sixth conductor 42. For example, in the Z direction, the inner conductor 43 is separated from the fifth conductor 41 and the sixth conductor 42. In the XY plane, a portion of the inner conductor 43 may overlap a portion of the fifth conductor 41. In the XY plane, another portion of the inner conductor 43 may overlap a portion of the sixth conductor 42. The inner conductor 43 may be capacitively connected to the fifth conductor 41 and the sixth conductor 42 because the inner conductor 43 overlaps a portion of the fifth conductor 41 and a portion of the sixth conductor 42 in the XY plane.

The third conductor 40 is configured to capacitively connect the first conductor 30 to the second conductor 33. For example, as described above, the fifth conductor 41 is configured to be electrically connected to the first electrical conductor layer 32 of the first conductor 30. The sixth conductor 42 is configured to be electrically connected to the second electrical conductor layer 35 of the second conductor 33. The fifth conductor 41 and the sixth conductor 42 may be capacitively connected to each other by the gap S1 and the inner conductor 43.

The fourth conductor 50 extends along the X direction. The fourth conductor 50 may extend along the XY plane. The fourth conductor 50 is separate from the third conductor 40. The fourth conductor 50 may face the third conductor 40. The fourth conductor 50 may be located on the lower surface 22 of the base 20. A portion of the fourth conductor 50 may be located inside the base 20. The fourth conductor 50 may have any shape depending on the shape of the third conductor 40. The fourth conductor 50 may be substantially rectangular.

The fourth conductor 50 is configured to be electrically connected to the first conductor 30 and the second conductor 33. For example, as illustrated in FIG. 2, the fourth conductor 50 is configured to have a portion on the X-axis negative direction side that is electrically connected to the end portion of the first electrical conductor layer 31 of the first conductor 30. The fourth conductor 50 is configured to have a portion on the X-axis positive direction side that is electrically connected to the second electrical conductor layer 34 of the second conductor 33.

The fourth conductor 50 is configured to supply a potential that is a reference for the antenna 10. The fourth conductor 50 may be configured to be electrically connected to the ground of a device provided with the antenna 10. For example, as illustrated in FIG. 4 described later, the fourth conductor 50 may be configured to have a portion electrically connected to a ground conductor 91 of a circuit substrate 90. A variety of parts of the device provided with the antenna 10 may be located on the Z-axis negative direction side of the fourth conductor 50. The antenna 10 can maintain a radiation efficiency at the operating frequency because of having the artificial magnetic conductor character described above, even if the variety of parts are located on the Z-axis negative direction side of the fourth conductor 50.

The power supply line 60 is configured to be electromagnetically connected to the third conductor 40. In the present disclosure, the "electromagnetic connection" may be an electrical connection or a magnetic connection. In the present embodiment, the power supply line 60 is configured to have one end electrically connected to the sixth conductor 42 of the third conductor 40. The power supply line 60 is configured to have the other end electrically connected to the connecting part 80. The power supply line 60 may be located on the upper surface 21 of the base 20. A portion of the power supply line 60 may be located inside the base 20.

The power supply line 60 is configured to supply electrical power from an RF module or the like via the connecting part 80 to the third conductor 40 when the antenna 10 emits electromagnetic waves. The power supply line 60 is configured to supply electrical power from the third conductor 40 via the connecting part 80 to the RF module or the like when the antenna 10 receives electromagnetic waves.

When the antenna 10 resonates at a predetermined frequency, a loop current may be generated that flows in a loop through the first conductor 30, the second conductor 33, the third conductor 40, and the fourth conductor 50. From the perspective of the loop current, the first conductor 30 is seen as an electrical wall extending along the YZ plane on the X-axis negative direction side, and the second conductor 33 is seen as an electrical wall extending along the YZ plane on the X-axis positive direction side. From the perspective of the loop current, the conductor or the like is not located on the Y-axis positive and negative direction sides. In other words, from the perspective of the loop current, the Y-axis positive and negative direction sides are electrically open. Because the Y-axis positive and negative direction sides are electrically open, the XZ plane on the Y-axis positive direction side and the XY plane on the Y-axis negative direction side are seen as magnetic walls from the perspective of the loop current. The loop current is surrounded by these two electrical walls and two magnetic walls, thus the antenna 10 exhibits the artificial magnetic conductor character with respect to a predetermined frequency of electromagnetic waves incident on the upper surface 21 of the base 20 from the Z-axis positive direction side.

The reinforcing member 70 is configured to protect at least a portion of any of the first conductor 30 and the second conductor 33. The reinforcing member 70 is located on at least a portion of any of the first conductor 30 and the second conductor 33. The reinforcing member 70 includes a first reinforcing member 71 and a second reinforcing member 72. However, the reinforcing member 70 may include at least one of the first reinforcing member 71 and the second reinforcing member 72 depending on the placement location and the like of the antenna 10. Each of the first reinforcing member 71 and the second reinforcing member 72 includes a dielectric material. The first reinforcing member 71 and the second reinforcing member 72 may include the same dielectric material, or may include different dielectric materials.

As illustrated in FIG. 2, the first reinforcing member 71 may be located on at least a portion of the first conductor 30. The first reinforcing member 71 may be located on the first electrical conductor layer 32. The first reinforcing member 71 may be located on the first electrical conductor layer 32 so as to be positioned at the end portion of the first connection conductor 31. The first reinforcing member 71 may extend on the first electrical conductor layer 32 so as to be positioned at the end portions of the plurality of first connection conductors 31.

The area of the first reinforcing member 71 in the XY plane may be smaller than the area of the first electrical conductor layer 32 in the XY plane. The area of the first reinforcing member 71 in the XY plane may be an area capable of covering the end portions of the plurality of first connection conductors 31. The shape of the first reinforcing member 71 may depend on the arrangement of the first connection conductors 31 in the XY plane. For example, when the plurality of first connection conductors 31 are aligned in two rows in the Y direction, the shape of the first reinforcing member 71 may be substantially rectangular. The material of the first reinforcing member 71 and the thickness of the first reinforcing member 71 in the Z direction may be selected as appropriate in consideration of a stress applied to the first conductor 30.

As illustrated in FIG. 3, the region A of the antenna 10 may bend toward the Z-axis positive direction with respect to the X direction. The first reinforcing member 71 being located on at least a portion of the first conductor 30 may reduce the degree of deformation of the first conductor 30 when the region A of the antenna 10 is bent. The degree of deformation of the first conductor 30 being reduced may reduce the stress applied to the first connection conductor 31. The stress applied to the first connection conductor 31 being reduced may reduce the likelihood of the first connection conductor 31 breaking. The first reinforcing member 71 being located on the first electrical conductor layer 32 so as to be positioned at the end portion of the first connection conductor 31 may further reduce the stress applied to the first connection conductor 31. The stress applied to the first connection conductor 31 being further reduced may further reduce the likelihood of the first connection conductor 31 breaking.

As illustrated in FIG. 2, the second reinforcing member 72 may be located on at least a portion of the second conductor 33. The second reinforcing member 72 may be located on the second electrical conductor layer 35. The second reinforcing member 72 may be located on the second electrical conductor layer 35 so as to be positioned at the end portion of the second connection conductor 34. The second reinforcing member 72 may extend on the second electrical conductor layer 35 so as to be positioned at the end portions of the plurality of second connection conductors 34.

The area of the second reinforcing member 72 in the XY plane may be smaller than the area of the second electrical conductor layer 35 in the XY plane. The area of the second reinforcing member 72 in the XY plane may be an area capable of covering the end portions of the plurality of second connection conductors 34. The shape of the second reinforcing member 72 may depend on the arrangement of the second connection conductors 34 in the XY plane. For example, when the plurality of second connection conductors 34 are aligned in two rows in the Y direction, the shape of the second reinforcing member 72 may be substantially rectangular. The material of the second reinforcing member 72 and the thickness of the second reinforcing member 72 in the Z direction may be selected as appropriate in consideration of a stress applied to the second conductor 33.

As illustrated in FIG. 4, the region A of the antenna 10 may bend toward the Z-axis negative direction with respect to the X direction. The configuration illustrated in FIG. 4 corresponds to a cross-sectional view taken along a line L2-L2 in FIG. 1. When the region A of the antenna 10 is bent, the second reinforcing member 72 being located on at least a portion of the second conductor 33 may reduce the likelihood of the second connection conductor 34 breaking, similar to the first reinforcing member 71. The second reinforcing member 72 being located on the second electrical conductor layer 35 so as to be positioned at the end portion of the second connection conductor 34 may further reduce the likelihood of breaking the second connection conductor 34, similar to the first reinforcing member 71.

As illustrated in FIG. 4, in a case that the circuit substrate 90 is located on the Z-axis negative direction side of the antenna 10, the second reinforcing member 72 may be located to overlap the connecting part 80 in the XY plane. The second reinforcing member 72 may be located on the second electrical conductor layer 35 to cover the opening portion 35*a*. The second reinforcing member 72 being located to overlap the connecting part 80 in the XY plane may reduce the degree of deformation of the connecting part 80 and a solder 95 described later. The degree of deformation of the connecting part 80 and the solder 95 described later being reduced may reduce a stress applied to the connecting part 80 and the solder 95 described later. The stress applied to the connecting part 80 and the solder 95 described later being reduced may reduce the likelihood of the connecting part 80 and the solder 95 (described later) breaking.

The connecting part 80 is aligned with the second connection conductor 34 in the Y direction. The connecting part 80 may be located closer to the Y-axis positive direction side than the second connection conductor 34. The connecting part 80 is configured to electrically connect the power supply line 60 to the circuit substrate 90. The connecting part 80 may be any part. For example, the connecting part 80 may be a connector of a surface mount technology (SMT) type.

Figure 12:
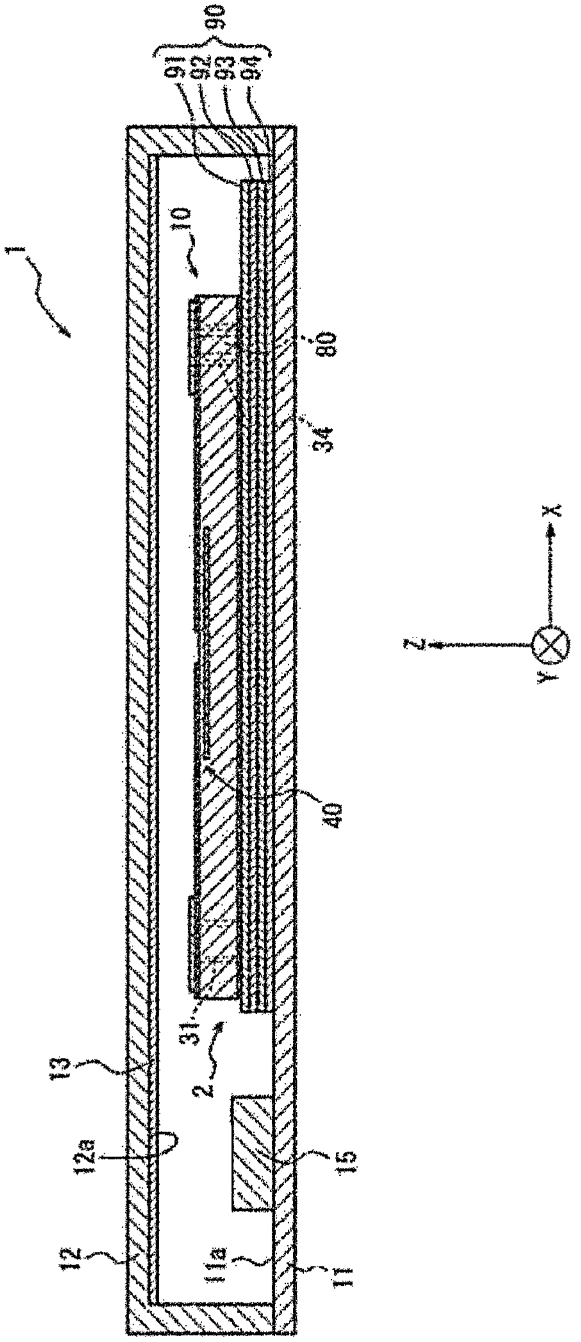
FIG. 12 is a cross-sectional view of the wireless communication device illustrated in FIG. 11.

The circuit substrate 90 may be one of parts of the device provided with the antenna 10. The circuit substrate 90 may be a multilayer substrate. The circuit substrate 90 is located on the Z-axis negative direction side of the antenna 10. In the configuration illustrated in FIG. 4, a portion of the antenna 10 may overlap a portion of the circuit substrate 90 in the XY plane. However, as illustrated in FIG. 12 described later, the antenna 10 may entirely overlap the circuit substrate 90 in the XY plane. The circuit substrate 90, in the case of overlapping a portion of the antenna 10, may be configured as a printed circuit board (PCB), for example. The circuit substrate 90, in the case of entirely overlapping the antenna 10, may be configured as a flexible printed circuit, for example.

The circuit substrate 90 includes a ground conductor 91, an insulating layer 92, an insulating layer 93, a wiring layer 94, and the solder 95.

The ground conductor 91 includes an electrically conductive material. The ground conductor 91 is located on the Z-axis positive direction side of the circuit substrate 90. The ground conductor 91 is configured to be electrically connected to the ground of the device provided with the antenna 10.

Each of the insulating layer 92 and the insulating layer 93 includes any insulating material. The insulating layer 92 is located on the Z-axis negative direction side of the ground conductor 91. The insulating layer 93 is located on the Z-axis negative direction side of the wiring layer 94.

The wiring layer 94 is located between the insulating layer 92 and the insulating layer 93. The wiring layer 94 includes a wiring pattern 94A and an insulating layer 94B including any insulating material. The wiring pattern 94A includes an electrically conductive material. The wiring pattern 94A is configured to be electrically connected to the RF module. The solder 95 is located in a portion of the wiring pattern 94A. The wiring pattern 94A may be electrically connected to the connecting part 80 by the solder 95.

The solder 95 is located between the connecting part 80 and the wiring pattern 94A. The solder 95 is configured to electrically connect the connecting part 80 to the wiring pattern 94A.

In this manner, the antenna 10 includes the reinforcing member 70 located on at least a portion of any of the first conductor 30 and the second conductor 33. The first reinforcing member 71 may reduce the degree of deformation of the first conductor 30 when the region A of the antenna 10 is bent. The degree of deformation of the first conductor 30 being reduced may reduce the likelihood of the first connection conductor 31 breaking. The second reinforcing member 72 may reduce the degree of deformation of the second conductor 33 when the region A of the antenna 10 is bent. The degree of deformation of the second conductor 33 being reduced may reduce the likelihood of the second connection conductor 34 breaking. Thus, according to the present embodiment, the novel antenna 10 excellent in long-term reliability can be provided.

Figure 5:
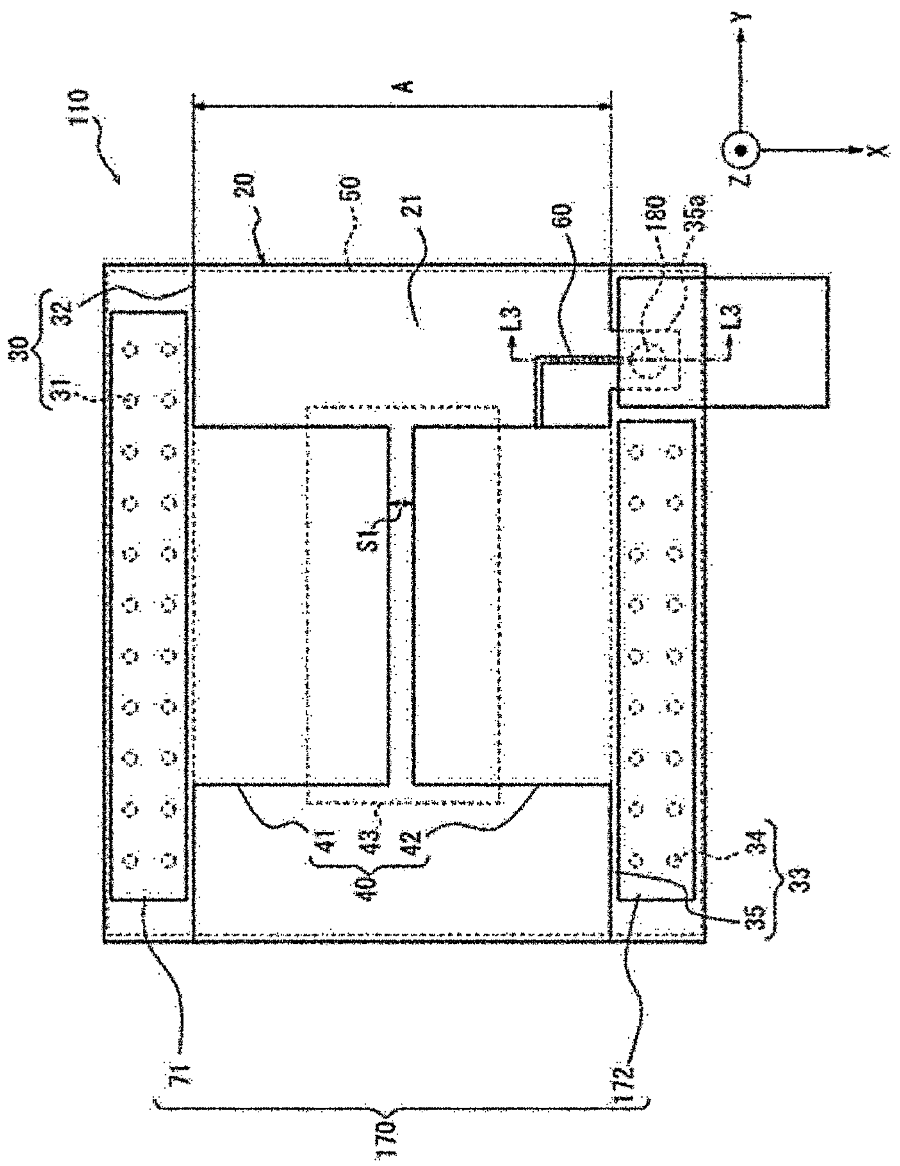
FIG. 5 is a plan view of an antenna according to another embodiment of the present disclosure.
Figure 6:
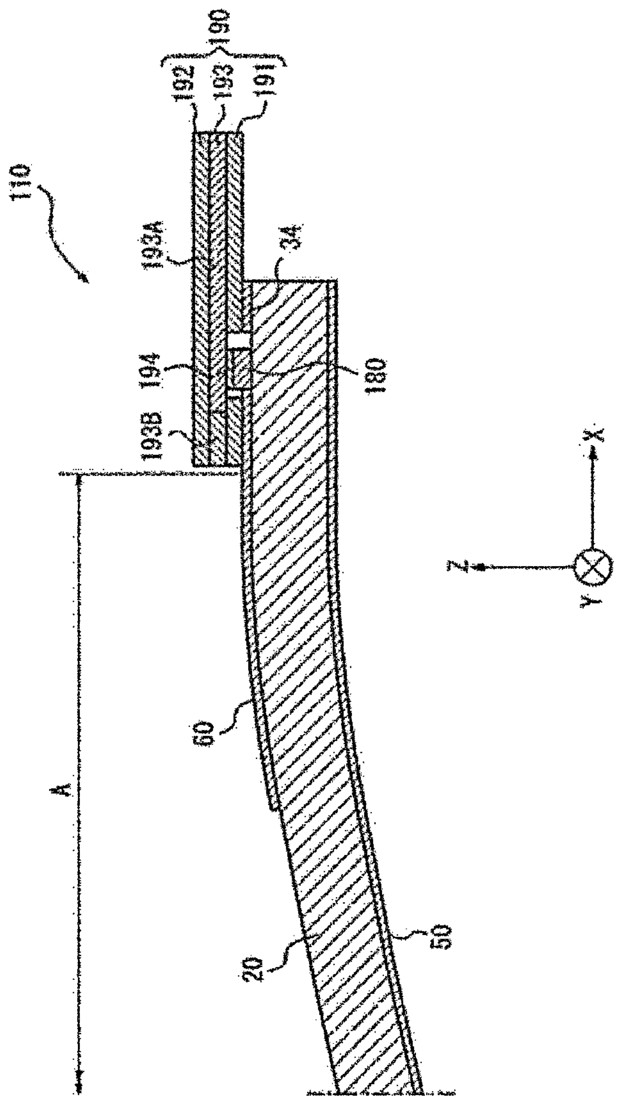
FIG. 6 is a diagram illustrating an example of a usage state of the antenna illustrated in FIG. 5.

FIG. 5 is a plan view of an antenna 110 according to another embodiment of the present disclosure. FIG. 6 is a diagram illustrating an example of a usage state of the antenna 110 illustrated in FIG. 5. The configuration illustrated in FIG. 6 corresponds to the cross-sectional view taken along a line L3-L3 in FIG. 5.

The antenna 110 includes the base 20, the first conductor 30, the second conductor 33, the third conductor 40, the fourth conductor 50, the power supply line 60, and a reinforcing member 170. The antenna 110 may further include a connecting part 180.

The antenna 110 may exhibit the artificial magnetic conductor character with respect to a predetermined frequency of electromagnetic waves externally incident on a plane where the third conductor 40 is located, in the same manner as or similar manner to the antenna 10. At least a portion of the antenna 110 may be flexible in the same manner as or similar manner to the antenna 10. The antenna 110 may be configured as a flexible printed circuit.

A circuit substrate 190 is located at a portion of the antenna 110. The circuit substrate 190 is located on the Z-axis positive direction side of the antenna 110.

The reinforcing member 170 is configured to protect at least a portion of any of the first conductor 30 and the second conductor 33. The reinforcing member 170 is located on at least a portion of any of the first conductor 30 and the second conductor 33. The reinforcing member 170 includes the first reinforcing member 71 and a second reinforcing member 172. However, the reinforcing member 170 may include at least one of the first reinforcing member 71 and the second reinforcing member 172 depending on the placement location and the like of the antenna 10. The second reinforcing member 172 includes a dielectric material.

The second reinforcing member 172 may be located on at least a portion of the second conductor 33. The second reinforcing member 172 may be located on the second electrical conductor layer 35. However, the second reinforcing member 172 need not be located on a portion in the second electrical conductor layer 35 where the connecting part 80 and the circuit substrate 190 are located. Other configurations of the second reinforcing member 172 are the same as or similar to the second reinforcing member 72 as illustrated in FIG. 1.

As illustrated in FIG. 6, the region A of the antenna 110 may bend toward the Z-axis negative direction. When the region A of the antenna 110 is bent, the second reinforcing member 172 being located on at least a portion of the second conductor 33 may reduce the likelihood of the second connection conductor 34 breaking, similar to the second reinforcing member 72. The second reinforcing member 172 being located above the end portion of the second connection conductor 34 may further reduce the likelihood of the second connection conductor 34 breaking, similar to the second reinforcing member 72.

The connecting part 180 is aligned with the second connection conductor 34 in the Y direction. The connecting part 180 may be located closer to the Y-axis positive direction side than the second connection conductor 34. The connecting part 180 is configured to electrically connect the power supply line 60 to the circuit substrate 190. The connecting part 180 may be any part. For example, the connecting part 180 may be a connector of a surface mount technology type.

The circuit substrate 190 may be one of parts of the device provided with the antenna 110. The circuit substrate 190 may be a multilayer substrate. The circuit substrate 190 is located on the Z-axis positive direction side of the antenna 110. A portion of the circuit substrate 190 may overlap a portion of the antenna 110 on the X-axis positive direction side in the XY plane. The circuit substrate 190 includes an insulating layer 191, an insulating layer 192, a wiring layer 193, and a solder 194.

Each of the insulating layer 191 and the insulating layer 192 includes any insulating material. The insulating layer 191 is a lowermost layer. The insulating layer 191 is located on the antenna 110. The insulating layer 192 is located on the Z-axis positive direction side of the wiring layer 193.

The wiring layer 193 is located between the insulating layer 191 and the insulating layer 192. The wiring layer 193 includes a wiring pattern 193A and an insulating layer 193B including any insulating material. The wiring pattern 193A includes an electrically conductive material. The wiring pattern 193A is configured to be electrically connected to the RF module. The solder 194 is located in a portion of the wiring pattern 193A. The wiring pattern 193A may be electrically connected to the connecting part 180 by the solder 194.

The solder 194 is located between the connecting part 180 and the wiring pattern 193A. The solder 194 is configured to electrically connect the connecting part 180 to the wiring pattern 193A.

Other configurations and effects of the antenna 110 are the same or similar to those of the antenna 10 as illustrated in FIG. 1.

Figure 7:
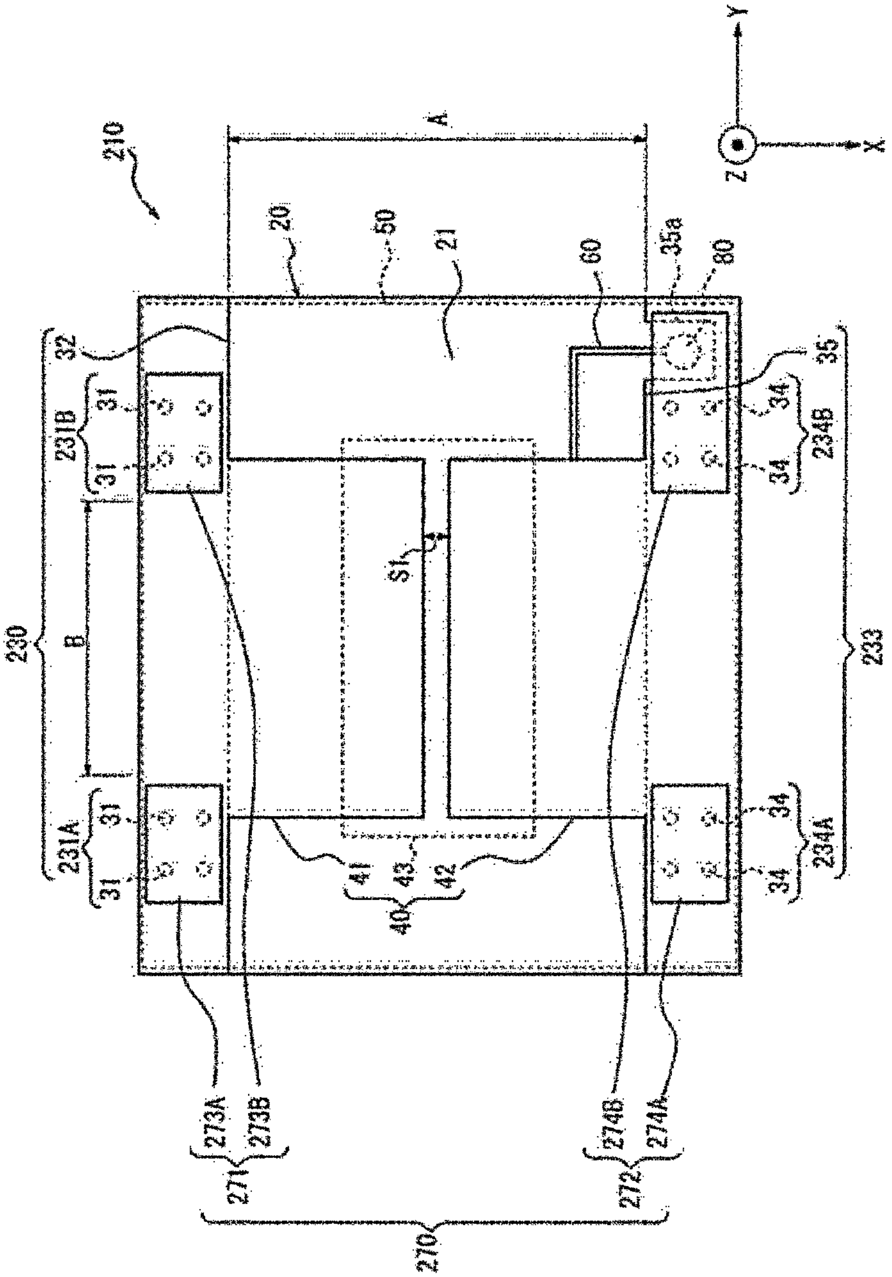
FIG. 7 is a plan view of an antenna according to still another embodiment of the present disclosure.

FIG. 7 is a plan view of an antenna 210 according to still another embodiment of the present disclosure. The antenna 210 includes the base 20, a first conductor 230, a second conductor 233, the third conductor 40, the fourth conductor 50, the power supply line 60, and a reinforcing member 270. The antenna 210 may further include the connecting part 80. Each of the first conductor 230 and the second conductor 233 includes an electrically conductive material. The first conductor 230, the second conductor 233, the third conductor 40, the fourth conductor 50, and the power supply line 60 may include the same electrically conductive material or may include different electrically conductive materials.

The antenna 210 may exhibit the artificial magnetic conductor character with respect to a predetermined frequency of electromagnetic waves externally incident on a plane where the third conductor 40 is located, in the same manner as or similar manner to the antenna 10.

At least a portion of the antenna 210 may be flexible. The region A of the antenna 210 may be bent in the X direction depending on the placement location and the like of the antenna 210. A region B of the antenna 210 may be bent in the Y direction. The region B of the antenna 210 may be bent toward the Z-axis positive direction with respect to the Y direction, or may be bent toward the Z-axis negative direction. The region B is a partial region of the antenna 210 in the Y direction. Part or all of the region B may overlap part or all of the region A. The region B may be a region including at least a portion of the third conductor 40. The region B may be a region not including the first connection conductor 31 or the second connection conductor 34. The antenna 210 may be configured as a flexible printed circuit.

The circuit substrate 90 is located at a portion of the antenna 210 similar to the configuration illustrated in FIG. 4. The circuit substrate 90 is located on the Z-axis negative direction side of the antenna 210 similar to the configuration illustrated in FIG. 4.

The first conductor 230 includes a first connection conductor set 231A, a first connection conductor set 231B, and the first electrical conductor layer 32. Hereinafter, when the first connection conductor set 231A and the first connection conductor set 231B are not particularly distinguished, they are collectively referred to as the "first connection conductor set 231".

The first connection conductor set 231 includes at least one first connection conductor 31. In a case that the first connection conductor set 231 includes four first connection conductors 31, the plurality of first connection conductors 31 may be aligned in two rows in the Y direction.

The first connection conductor set 231A and the first connection conductor set 231B are separated from each other by a first interval in the Y direction. The first interval is wider than an interval at which the first connection conductors 31 are aligned in the Y direction in the first connection conductor set 231. The first interval may be set as appropriate in consideration of a curvature of the region B of the antenna 210 in the Y direction.

The first connection conductor set 231A is located near a corner portion, of four corner portions of the fifth conductor 41, on the X-axis negative direction side and the Y-axis negative direction side. The first connection conductor set 231B is located near a corner portion, of four corner portions of the fifth conductor 41, on the X-axis negative direction side and the Y-axis positive direction side.

Other configurations of the first conductor 230 are the same as or similar to those of the first conductor 30 as illustrated in FIG. 1.

The second conductor 233 includes a second connection conductor set 234A, a second connection conductor set 234B, and the second electrical conductor layer 35. Hereinafter, when the second connection conductor set 234A and the second connection conductor set 234B are not particularly distinguished, they are collectively referred to as the "second connection conductor set 234".

The second connection conductor set 234 includes at least one second connection conductor 34. In a case that the second connection conductor set 234 includes four second connection conductors 34, the plurality of second connection conductors 34 may be aligned in two rows in the Y direction.

The second connection conductor set 234A and the second connection conductor set 234B are separated from each other by a second interval in the Y direction. The second interval may be the same as the first interval, or may be different from the first interval. The second interval is wider than an interval at which the second connection conductors 34 are aligned in the Y direction in the second connection conductor set 234. The second interval may be set as appropriate in consideration of the curvature of the region B of the antenna 210 in the Y direction.

The second connection conductor set 234A is located near a corner portion, of four corner portions of the sixth conductor 42, on the X-axis positive direction side and the Y-axis negative direction side. The second connection conductor set 234B is located near a corner portion, of four corner portions of the sixth conductor 42, on the X-axis positive direction side and the Y-axis positive direction side.

Other configurations of the second conductor 233 are the same as or similar to those of the second conductor 33 as illustrated in FIG. 1.

The reinforcing member 270 is configured to protect at least a portion of any of the first conductor 230 and the second conductor 233. The reinforcing member 270 is located on at least a portion of any of the first conductor 230 and the second conductor 233. The reinforcing member 270 includes a first reinforcing member 271 and a second reinforcing member 272, the first reinforcing member 271 including a third reinforcing member 273A and a third reinforcing member 273B, the second reinforcing member 272 including a fourth reinforcing member 274A and a fourth reinforcing member 274B. However, the reinforcing member 270 may include at least one of the third reinforcing member 273A, the third reinforcing member 273B, the fourth reinforcing member 274A, and the fourth reinforcing member 274B depending on the placement location and the like of the antenna 210. Hereinafter, when the third reinforcing member 273A and the third reinforcing member 273B are not particularly distinguished, they are referred to as the "third reinforcing member 273". When the fourth reinforcing member 274A and the fourth reinforcing member 274B are not particularly distinguished, they are referred to as the "fourth reinforcing member 274". Each of the third reinforcing member 273 and the fourth reinforcing member 274 includes a dielectric material. The third reinforcing member 273A, the third reinforcing member 273B, the fourth reinforcing member 274A, and the fourth reinforcing member 274B may include the same dielectric material, or may include different dielectric materials.

Each of the third reinforcing member 273A and the third reinforcing member 273B is located on the first electrical conductor layer 32. The third reinforcing member 273A and the third reinforcing member 273B are separated from each other in the Y direction.

The third reinforcing member 273A is located in the first connection conductor set 231A. The third reinforcing member 273A may be located on the first electrical conductor layer 32 so as to be positioned at the end portion of the first connection conductor 31 in the first connection conductor set 231A. The third reinforcing member 273A may extend on the first electrical conductor layer 32 so as to be positioned at the end portions of the plurality of first connection conductors 31 in the first connection conductor set 231A.

The third reinforcing member 273B is located in the first connection conductor set 231B. The third reinforcing member 273B may be located on the first electrical conductor layer 32 so as to be positioned at the end portion of the first connection conductor 31 in the first connection conductor set 231B. The third reinforcing member 273B may extend on the first electrical conductor layer 32 so as to be positioned at the end portions of the plurality of first connection conductors 31 in the first connection conductor set 231B.

The area of the third reinforcing member 273 in the XY plane may be an area capable of covering the end portions of the first connection conductors 31 included in the first connection conductor set 231. The shape of the third reinforcing member 273 may depend on the arrangement of the first connection conductors 31 in the first connection conductor set 231 in the XY plane. For example, when the plurality of first connection conductors 31 are aligned in two rows in the Y direction in the first connection conductor set 231, the shape of the third reinforcing member 273 may be substantially rectangular. The material and the thickness in the Z direction of the third reinforcing member 273 may be selected as appropriate in consideration of a stress applied to the first conductor 230.

The region A of the antenna 210 may bend toward the Z-axis positive direction similar to the configuration illustrated in FIG. 3. The third reinforcing member 273 being located in the first connection conductor set 231 may reduce the stress applied to the first connection conductor 31 and reduce the likelihood of the first connection conductor 31 breaking. The region B of the antenna 210 may be bent in the Y direction. When the region B of the antenna 210 is bent, the third reinforcing member 273 being located in the first connection conductor set 231 may reduce the stress applied to the first connection conductor 31 and reduce the likelihood of the first connection conductor 31 breaking.

Each of the fourth reinforcing member 274A and the fourth reinforcing member 274B is located on the second electrical conductor layer 35. The fourth reinforcing member 274A and the fourth reinforcing member 274B are separated from each other in the Y direction.

The fourth reinforcing member 274A is located in the second connection conductor set 234A. The fourth reinforcing member 274A may be located on the second electrical conductor layer 35 so as to be positioned at the end portion of the second connection conductor 34 in the second connection conductor set 234A. The fourth reinforcing member 274A may extend on the second electrical conductor layer 35 so as to be positioned at the end portions of the plurality of second connection conductors 34 in the second connection conductor set 234A.

The fourth reinforcing member 274B is located in the second connection conductor set 234B. The fourth reinforcing member 274B may be located on the second electrical conductor layer 35 so as to be positioned at the end portion of the second connection conductor 34 in the second connection conductor set 234B. The fourth reinforcing member 274B may extend on the second electrical conductor layer 35 so as to be positioned at the end portions of the plurality of second connection conductors 34 in the second connection conductor set 234B.

The area of the fourth reinforcing member 274 in the XY plane may be an area capable of covering the end portions of the plurality of second connection conductors 34 included in the second connection conductor set 234. The shape of the fourth reinforcing member 274 may depend on the arrangement of the second connection conductors 34 in the second connection conductor set 234 in the XY plane. For example, when the plurality of second connection conductors 34 are aligned in two rows in the Y direction in the second connection conductor set 234, the shape of the fourth reinforcing member 274 may be substantially rectangular. The material and the thickness in the Z direction of the fourth reinforcing member 274 may be selected as appropriate in consideration of a stress applied to the second conductor 233.

The fourth reinforcing member 274 being located in the second connection conductor set 234 may reduce the likelihood of the second connection conductor 34 breaking in the second connection conductor set 234, in the same manner as or similar manner to the third reinforcing member 273. When the region B of the antenna 210 is bent in the Y direction, the fourth reinforcing member 274 being located in the second connection conductor set 234 may reduce the stress applied to the second connection conductor 34 and reduce the likelihood of the second connection conductor 34 breaking.

In a case that the circuit substrate 90 is located on the Z-axis negative direction side of the antenna 210 similar to the configuration illustrated in FIG. 4, the fourth reinforcing member 274B may be located to overlap the connecting part 80 in the XY plane. Similar to the configuration illustrated in FIG. 4, the fourth reinforcing member 274B being located to overlap the connecting part 80 may reduce the degree of deformation of the connecting part 80 and the solder 95 and reduce the likelihood of the connecting part 80 and the solder 95 breaking.

Other configurations and effects of the antenna 210 are the same or similar to those of the antenna 10 as illustrated in FIG. 1.

Figure 8:
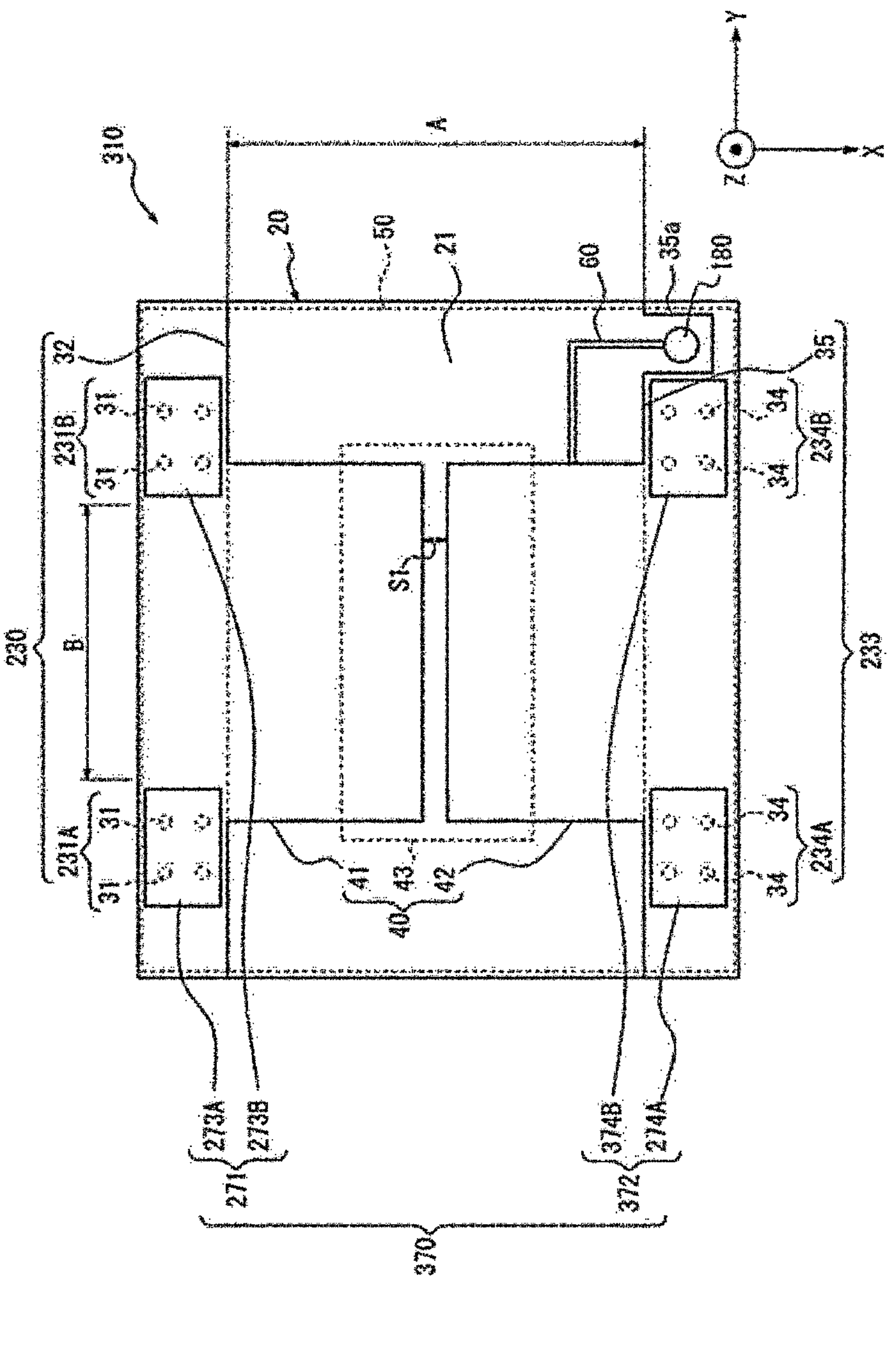
FIG. 8 is a plan view of an antenna according to still another embodiment of the present disclosure.

FIG. 8 is a plan view of an antenna 310 according to still another embodiment of the present disclosure. The antenna 310 includes the base 20, the first conductor 230, the second conductor 233, the third conductor 40, the fourth conductor 50, the power supply line 60, and a reinforcing member 370. The antenna 310 may further include the connecting part 180.

The antenna 310 may exhibit the artificial magnetic conductor character with respect to a predetermined frequency of electromagnetic waves externally incident on a plane where the third conductor 40 is located, in the same manner as or similar manner to the antenna 10. At least a portion of the antenna 310 may be flexible similar to the antenna 210. The antenna 310 may be configured as a flexible printed circuit.

The circuit substrate 190 is located at a portion of the antenna 310 similar to the configuration illustrated in FIGS. 5 and 6. The circuit substrate 190 is located on the Z-axis positive direction side of the antenna 210 similar to the configuration illustrated in FIG. 6.

The reinforcing member 370 includes the first reinforcing member 271 and a second reinforcing member 372. The second reinforcing member 372 includes the fourth reinforcing member 274A and a fourth reinforcing member 374B.

The fourth reinforcing member 374B includes a dielectric material. The fourth reinforcing member 374B, the third reinforcing member 273A, the third reinforcing member 273B, and the fourth reinforcing member 274A may include the same dielectric material, or may include different dielectric materials.

The fourth reinforcing member 374B need not be located on a portion in the second electrical conductor layer 35 where the connecting part 180 and the circuit substrate 190 are located. Other configurations of the fourth reinforcing member 374B are the same as or similar to those of the fourth reinforcing member 274.

Other configurations and effects of the antenna 310 are the same or similar to those of the antenna 10 as illustrated in FIG. 1, the antenna 110 as illustrated in FIG. 5, and/or the antenna 210 as illustrated in FIG. 7.

Figure 9:
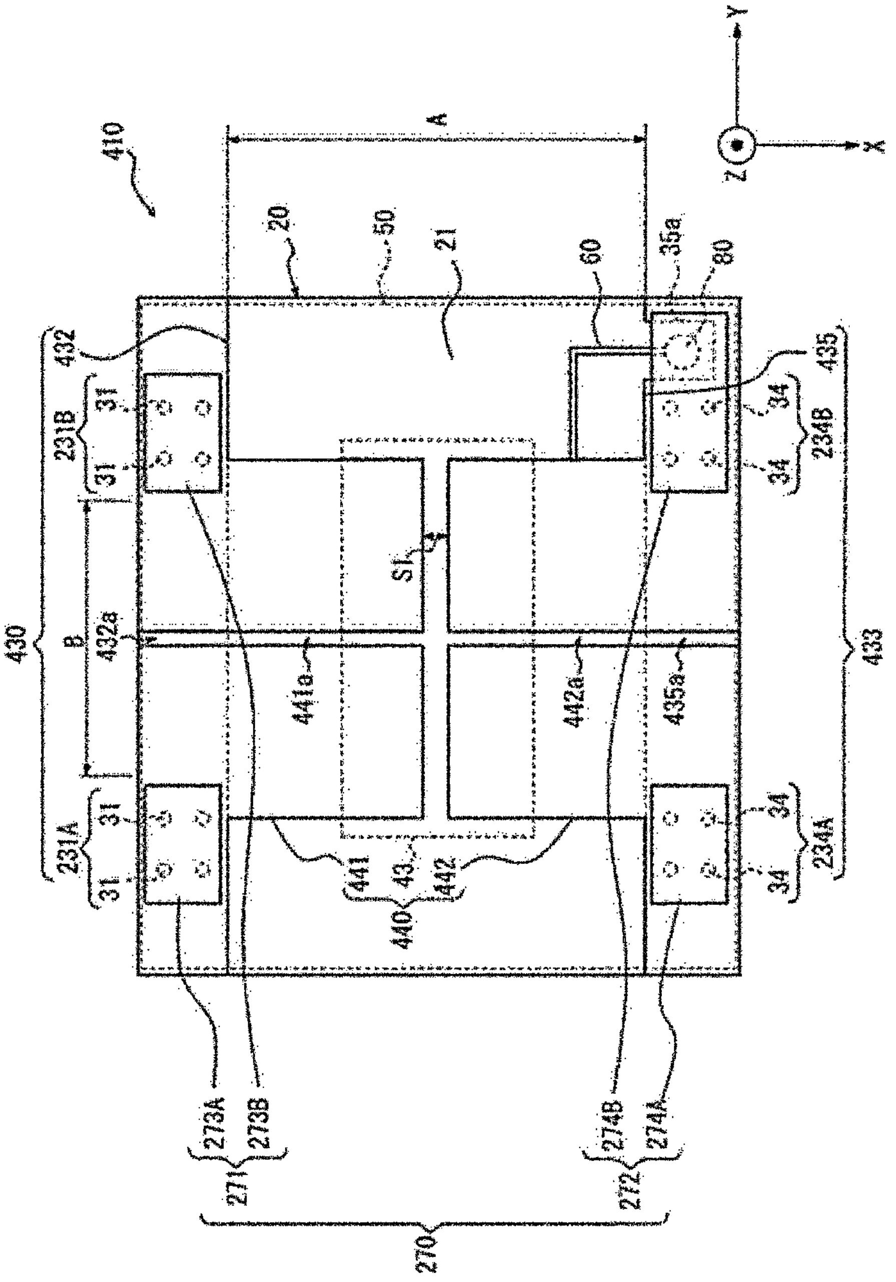
FIG. 9 is a plan view of an antenna according to still another embodiment of the present disclosure.

FIG. 9 is a plan view of an antenna 410 according to still another embodiment of the present disclosure. The antenna 410 includes the base 20, a first conductor 430, a second conductor 433, a third conductor 440, the fourth conductor 50, the power supply line 60, and the reinforcing member 270. The antenna 410 may further include the connecting part 80. The antenna 410 may include the connecting part 180 instead of the connecting part 80. In the case that antenna 410 includes the connecting part 180, the antenna 410 may include the reinforcing member 370 instead of the reinforcing member 270. Each of the first conductor 430, the second conductor 433, and the third conductor 440 includes an electrically conductive material. The first conductor 430, the second conductor 433, the third conductor 440, the fourth conductor 50, and the power supply line 60 may include the same electrically conductive material or may include different electrically conductive materials.

The antenna 410 may exhibit the artificial magnetic conductor character with respect to a predetermined frequency of electromagnetic waves externally incident on a plane where the third conductor 440 is located.

At least a portion of the antenna 410 may be flexible in the same manner as or similar manner to the antenna 210. The antenna 410 may be configured as a flexible printed circuit.

The first conductor 430 includes the first connection conductor set 231A, the first connection conductor set 231B, and a first electrical conductor layer 432. The second conductor 433 includes the second connection conductor set 234A, the second connection conductor set 234B, and a second electrical conductor layer 435.

The first electrical conductor layer 432 includes a cut portion 432*a*. The cut portion 432*a* is located near the center of the antenna 410 in the Y direction. The second electrical conductor layer 435 includes a cut portion 435*a*. The cut portion 435*a* is located near the center of the antenna 410 in the Y direction. The cut portions 432*a* and 435*a* extend along the X direction. Other configurations of the first and second electrical conductor layers 432 and 435 are the same or similar to those of the first and second electrical conductor layers 32 and 35, respectively.

The third conductor 440 includes a fifth conductor 441, a sixth conductor 442, and the inner conductor 43. The fifth conductor 441 includes a cut portion 441*a*. The cut portion 441*a* is located near the center of the antenna 410 in the Y direction. The cut portion 441*a* may be connected to the cut portion 432*a* of the first electrical conductor layer 432. The sixth conductor 442 includes a cut portion 442*a*. The cut portion 442*a* is located near the center of the antenna 410 in the Y direction. The cut portion 442*a* may be connected to the cut portion 435*a* of the second electrical conductor layer 435. The cut portions 441*a* and 442*a* extend along the X direction.

Other configurations of the third conductor 440 are the same as or similar to those of the third conductor 40 as illustrated in FIG. 1.

In this manner, the antenna 410 includes the cut portion 432*a* in the first electrical conductor layer 432, the cut portion 435*a* in the second electrical conductor layer 435, the cut portion 441*a* in the fifth electrical conductor layer 441, and the cut portion 442*a* in the sixth electrical conductor layer 442. The antenna 410 including the cut portion 432*a*, the cut portion 435*a*, the cut portion 441*a*, and the cut portion 442*a* enables the region B of the antenna 410 to be easily bent in the Y direction. The width of each of the cut portion 432*a*, the cut portion 435*a*, the cut portion 441*a*, and the cut portion 442*a* in the Y direction may be set as appropriate in consideration of the curvature of the region B of the antenna 410 in the Y direction.

Other configurations and effects of the antenna 410 are the same as or similar to those of the antenna 10 as illustrated in FIG. 1, the antenna 110 as illustrated in FIG. 5, the antenna 210 as illustrated in FIG. 7, and/or the antenna 310 as illustrated in FIG. 8.

Figure 10:
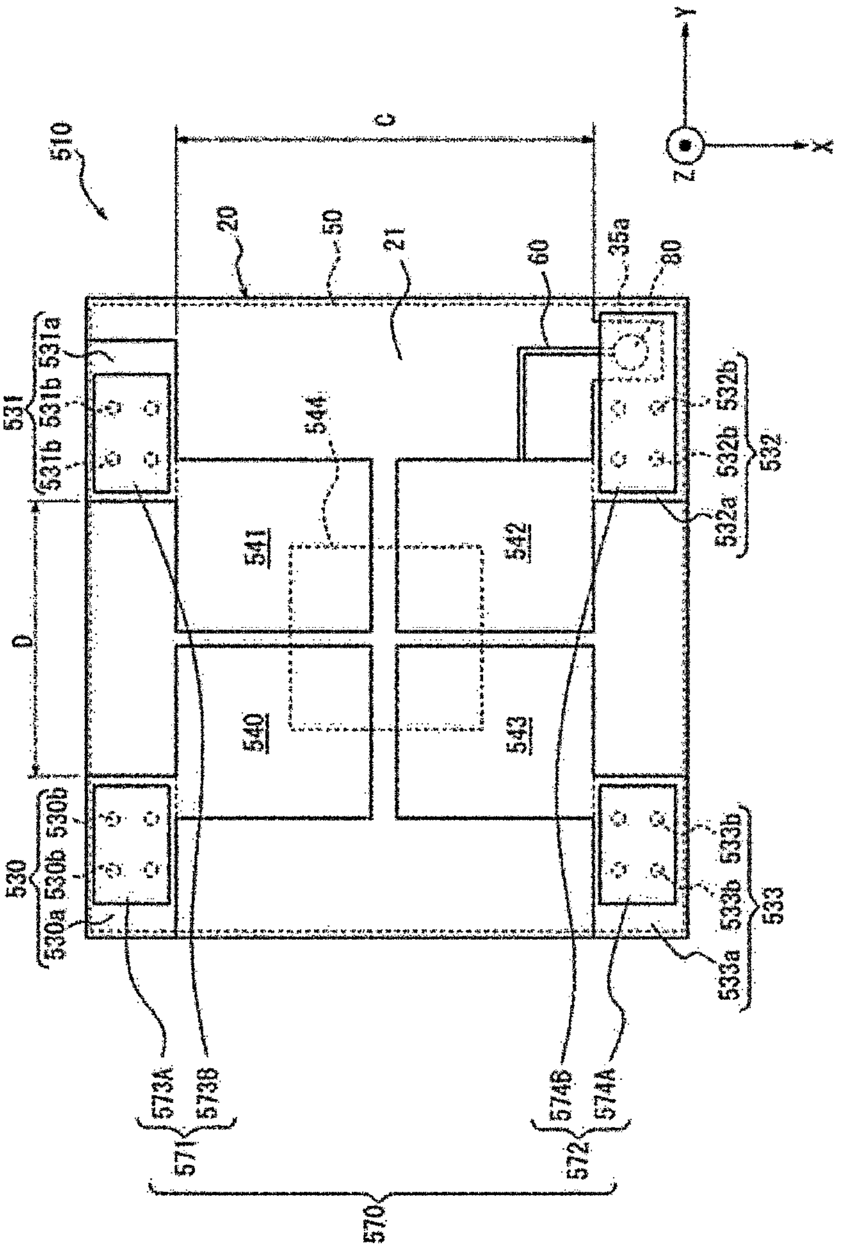
FIG. 10 is a plan view of an antenna according to still another embodiment of the present disclosure.

FIG. 10 is a plan view of an antenna 510 according to still another embodiment of the present disclosure. The antenna 510 includes the base 20, conductor sets 530, 531, 532, and 533, radiation conductors 540, 541, 542, and 543, an inner conductor 544, the fourth conductor 50, the power supply line 60, and a reinforcing member 570. The antenna 510 may further include the connecting part 80. The antenna 510 may include the connecting part 180 instead of the connecting part 80. Each of the conductor sets 530 to 533, the radiation conductors 540 to 543, and the inner conductor 544 includes an electrically conductive material. The conductor sets 530 to 533, the radiation conductors 540 to 543, the inner conductor 544, the fourth conductor 50, and the power supply line 60 may include the same electrically conductive material or may include different electrically conductive materials.

The antenna 510 may exhibit the artificial magnetic conductor character with respect to a predetermined frequency of electromagnetic waves externally incident on a plane where the radiation conductors 540 to 543 are located.

At least a portion of the antenna 510 may be flexible. The antenna 510 may be configured as a flexible printed circuit.

A region C of the antenna 510 may be bent in the X direction depending on the placement location and the like of the antenna 510. The region C is a partial region of the antenna 510 in the X direction. The region C may be a region including the radiation conductors 540 to 543. The region C may be a region not including the conductor sets 530 to 533. The antenna 510 may be bent toward the Z-axis positive direction with respect to the X direction similar to the configuration illustrated in FIG. 3, or may be bent toward the Z-axis negative direction similar to the configuration illustrated in FIG. 4.

A region D of the antenna 510 may be bent in the Y direction depending on the placement location and the like of the antenna 510. The region D is a partial region of the antenna 510 in the Y direction. The region D may be a region including the radiation conductors 540 to 543. The region D may be a region not including the conductor sets 530 to 533. The region D of the antenna 510 may be bent toward the Z-axis positive direction with respect to the Y direction, or may be bent toward the Z-axis negative direction.

The conductor set 530 and the conductor set 531 are aligned in the Y direction. The conductor set 532 and the conductor set 533 are aligned in the Y direction. The conductor set 530 and the conductor set 533 are aligned in the X direction. The conductor set 531 and the conductor set 532 are aligned in the X direction.

The conductor sets 530, 531, 532, and 533 include connection portions 530*a*, 531*a*, 532*a*, and 533*a*, and at least one of connection conductors 530*b*, 531*b*, 532*b*, and 533*b*, respectively. The connection portions 530*a* to 533*a* and the connection conductors 530*b* to 533*b* may include the same electrically conductive material, or may include different electrically conductive materials.

The connection portions 530*a* to 533*a* are located on the upper surface 21 of the base 20. The connection portions 530*a* to 533*a* may be planar. The connection portions 530*a* to 533*a* may be substantially rectangular. A portion of the connection portion 530*a* is configured to be electrically connected to a corner portion, of four corner portions of the radiation conductor 540, on the Y-axis negative direction side and the X-axis negative direction side. A portion of the connection portion 531*a* is configured to be electrically connected to a corner portion, of four corner portions of the radiation conductor 541, on the Y-axis positive direction side and the X-axis negative direction side. A portion of the connection portion 532*a* is configured to be electrically connected to a corner portion, of four corner portions of the radiation conductor 542, on the Y-axis positive direction side and the X-axis positive direction side. A portion of the connection portion 533*a* is configured to be electrically connected to a corner portion, of four corner portions of the radiation conductor 543, on the Y-axis negative direction side and the X-axis positive direction side.

The connection conductors 530*b* to 533*b* extend along the Z direction from the fourth conductor 50 toward the upper surface 21 of the base 20. Each of the connection conductors 530*b* to 533*b* includes two end portions. Each of the connection conductors 530*b* to 533*b* may be configured to have one end portion electrically connected to the fourth conductor 50. The connection conductors 530*b* to 533*b* may be configured to have the other end portions electrically connected to the respective connection portions 530*a* to 533*a*. Each of the connection conductors 530*b* to 533*b* may be a through hole conductor, a via conductor, or the like.

The conductor sets 530 to 533 are configured to be electrically connected to the different respective radiation conductors 540 to 543. For example, the conductor set 530 is configured to be electrically connected to the radiation conductor 540 by the connection portion 530*a*. The conductor set 531 is configured to be electrically connected to the radiation conductor 541 by the connection portion 531*a*. The conductor set 532 is configured to be electrically connected to the radiation conductor 542 by the connection portion 532*a*. The conductor set 533 is configured to be electrically connected to the radiation conductor 543 by the connection portion 533*a*.

The radiation conductors 540 to 543 expand along the XY plane. The radiation conductors 540 to 543 are separate from each other in the X direction and the Y direction. The radiation conductors 540 to 543 may be planar. The radiation conductors 540 to 543 are separate from the fourth conductor 50 in the Z direction. The radiation conductors 540 to 543 may face the fourth conductor 50. The radiation conductors 540 to 543 may be located on the upper surface 21 of the base 20.

The radiation conductor 540 and the radiation conductor 541 are spaced apart and aligned in the Y direction. The radiation conductor 542 and the radiation conductor 543 are spaced apart and aligned in the Y direction. The radiation conductor 540 and the radiation conductor 543 are spaced apart and aligned in the X direction. The radiation conductor 541 and the radiation conductor 542 are spaced apart and aligned in the X direction. The radiation conductors 540 to 533 are configured to be capacitively connected to each other by being spaced apart and aligned in the X and Y directions. The interval between the radiation conductor 540 and the radiation conductor 541 aligned in the Y direction, and the interval between the radiation conductor 542 and the radiation conductor 543 aligned in the Y direction may be adjusted as appropriate depending on the desired operating frequency of the antenna 510. The interval between the radiation conductor 540 and the radiation conductor 543 aligned in the X direction, and the interval between the radiation conductor 541 and the radiation conductor 542 aligned in the X direction may be adjusted as appropriate depending on the desired operating frequency of the antenna 510.

The inner conductor 544 is located inside the base 20 similar to the inner conductor 43. The inner conductor 544 is not electrically connected to the radiation conductors 540 to 533. The inner conductor 544 is located closer to the Z-axis negative direction side than the radiation conductors 540 to 533. The inner conductor 544 may be substantially rectangular.

The inner conductor 544 is configured to capacitively connect the radiation conductors 540 to 533 to each other. For example, the inner conductor 544 is separate from the radiation conductors 540 to 533. A portion of the inner conductor 544 may overlap a portion of the radiation conductors 540 to 533 in the Z direction. A portion of the inner conductor 544 overlapping a portion of the radiation conductors 540 to 533 may be allowed to be capacitively connected to a portion of the radiation conductors 540 to 533.

The power supply line 60 is configured to be electromagnetically connected to any of the radiation conductors 540 to 533. For example, the power supply line 60 is configured to be electrically connected to the radiation conductor 542.

The connection conductor 530*b* and the connection conductor 533*b* are a first connection pair aligned along the X direction. The connection conductor 531*b* and the connection conductor 532*b* are a first connection pair aligned along the X direction.

The antenna 510 may resonate at a first frequency along a first current path. The first current path includes the first connection pair of the connection conductors 530*b* and 533*b*, the radiation conductor 540, the radiation conductor 543, and the fourth conductor 50. The first current path includes the first connection pair of the connection conductors 531*b* and 532*b*, the radiation conductor 541, the radiation conductor 542, and the fourth conductor 50. When the antenna 510 resonates along the first current path, as viewed from a current flowing through the first current path, the connection conductors 530*b* and 531*b* are seen as an electrical wall extending along the YZ plane on the X-axis negative direction side, and the connection conductors 532*b* and 533*b* are seen as an electrical wall extending along the YZ plane on the X-axis positive direction side. As viewed from the current flowing through the first current path, the XZ plane on the Y-axis positive direction side is seen as a magnetic wall, and the XZ plane on the Y-axis negative direction side is seen as a magnetic wall. The current flowing through the first current path is surrounded by two electrical walls and two magnetic walls, thus the antenna 510 exhibits the artificial magnetic conductor character with respect to the electromagnetic waves at the first frequency that are incident on the upper surface 21 of the base 20 where the radiation conductors 540 to 543 are located and are polarized along the X direction.

The connection conductor 530*b* and the connection conductor 531*b* are a second connection pair aligned along the Y direction. The connection conductor 532*b* and the connection conductor 533*b* are a second connection pair aligned along the Y direction.

The antenna 510 may resonate at a second frequency along a second current path. The second current path includes the second connection pair of the connection conductors 530*b* and 531*b*, the radiation conductor 540, the radiation conductor 541, and the fourth conductor 50. The second current path includes the second connection pair of the connection conductors 532*b* and 533*b*, the radiation conductor 542, the radiation conductor 543, and the fourth conductor 50. When the antenna 510 resonates along the second current path, as viewed from a current flowing through the second current path, the connection conductors 530*b* and 533*b* are seen as an electrical wall extending along the XZ plane on the Y-axis negative direction side, and the connection conductors 531*b* and 532*b* are seen as an electrical wall extending along the XZ plane on the Y-axis positive direction side. As viewed from the current flowing through the second current path, the YZ plane on the X-axis positive direction side is seen as a magnetic wall, and the YZ plane on the X-axis negative direction side is seen as a magnetic wall. The current flowing through the second current path is surrounded by two electrical walls and two magnetic walls, thus the antenna 510 exhibits the artificial magnetic conductor character with respect to the electromagnetic waves at the second frequency that are incident on the upper surface 21 of the base 20 where the radiation conductors 540 to 543 are located and are polarized along the Y direction.

The reinforcing member 570 is configured to protect at least a portion of any of the conductor sets 530 to 533. The reinforcing member 570 is located on at least a portion of any of the conductor sets 530 to 533. The reinforcing member 570 includes a first reinforcing member 571 and a second reinforcing member 572, the first reinforcing member 571 including a third reinforcing member 573A and a third reinforcing member 573B, the second reinforcing member 572 including a fourth reinforcing member 574A and a fourth reinforcing member 574B. However, the reinforcing member 570 may include at least one of the third reinforcing member 573A, the third reinforcing member 573B, the fourth reinforcing member 574A, and the fourth reinforcing member 574B depending on the placement location and the like of the antenna 510. Each of the third reinforcing member 573A, the third reinforcing member 573B, the fourth reinforcing member 574A, and the fourth reinforcing member 574B includes a dielectric material. The third reinforcing member 573A, the third reinforcing member 573B, the fourth reinforcing member 574A, and the fourth reinforcing member 574B may include the same dielectric material, or may include different dielectric materials.

The third reinforcing member 573A is located in the conductor set 530. The third reinforcing member 573A may be located on the connection portion 530*a*. The third reinforcing member 573A may be located on the connection portion 530*a* so as to be positioned at the end portion of the connection conductor 530*b*. The area of the third reinforcing member 573A in the XY plane may be an area capable of covering the end portions of the connection conductors 530*b* on the Z-axis positive direction side included in the conductor set 530. The area of the third reinforcing member 573A in the XY plane may be smaller than the area of the connection portion 530*a* in the XY plane. The shape of the third reinforcing member 573A may depend on the arrangement of the connection conductors 530*b* in the conductor set 530 in the XY plane. The material and the thickness in the Z direction of the third reinforcing member 573A may be selected as appropriate in consideration of a stress applied to the conductor set 530.

The third reinforcing member 573A being located in the conductor set 530 may reduce a degree of deformation of the conductor set 530 when the region C of the antenna 510 is bent in the X direction and so on. The degree of deformation of the conductor set 530 being reduced may reduce a stress applied to the connection conductor 530*b*. The stress applied to the connection conductor 530*b* being reduced may reduce the likelihood of breaking the connection conductor 530*b*. The third reinforcing member 573A being located on the connection portion 530*a* so as to be positioned at the end portion of the connection conductor 530*b* may further reduce the stress applied to the connection conductor 530*b*. The stress applied to the connection conductor 530*b* being further reduced may further reduce the likelihood of the connection conductor 530*b* breaking.

The third reinforcing member 573B is located in the conductor set 531. The third reinforcing member 573B may be located on the connection portion 531*a*. The third reinforcing member 573B may be located on the connection portion 531*a* so as to be positioned at the end portion of the connection conductor 531*b*. The area of the third reinforcing member 573B in the XY plane may be an area capable of covering the end portions of the connection conductors 531*b* on the Z-axis positive direction side included in the conductor set 531. The area of the third reinforcing member 573B in the XY plane may be smaller than the area of the connection portion 531*a* in the XY plane. The shape of the third reinforcing member 573B may depend on the arrangement of the connection conductors 531*b* in the conductor set 531 in the XY plane. The material and the thickness in the Z direction of the third reinforcing member 573B may be selected as appropriate in consideration of a stress applied to the conductor set 531.

The third reinforcing member 573B being located in the conductor set 531 may reduce the likelihood of the connection conductor 531*b* breaking, similar to the third reinforcing member 573A. The third reinforcing member 573B being located on the connection portion 531*a* so as to be positioned at the end portion of the connection conductor 531*b* may further reduce the likelihood of the connection conductor 530*b* breaking, similar to the third reinforcing member 573A.

The fourth reinforcing member 574A is located in the conductor set 533. The fourth reinforcing member 574A may be located on the connection portion 533*a*. The fourth reinforcing member 574A may be located on the connection portion 533*a* so as to be positioned at the end portion of the connection conductor 533*b*. The area of the fourth reinforcing member 574A in the XY plane may be an area capable of covering the end portions of the connection conductors 533*b* on the Z-axis positive direction side included in the conductor set 533. The area of the fourth reinforcing member 574A in the XY plane may be smaller than the area of the connection portion 533*a* in the XY plane. The shape of the fourth reinforcing member 574A may depend on the arrangement of the connection conductors 533*b* in the conductor set 533 in the XY plane. The material and the thickness in the Z direction of the fourth reinforcing member 574A may be selected as appropriate in consideration of a stress applied to the conductor set 533.

The fourth reinforcing member 574A being located in the conductor set 533 may reduce the likelihood of the connection conductor 533*b* breaking, similar to the third reinforcing member 573A. The fourth reinforcing member 574A being located on the connection portion 533*a* so as to be positioned at the end portion of the connection conductor 533*b* may further reduce the likelihood of the connection conductor 533*b* breaking, similar to the third reinforcing member 573A.

The fourth reinforcing member 574B is located in the conductor set 532. The fourth reinforcing member 574B may be located on the connection portion 532*a*. The fourth reinforcing member 574B may be located on the connection portion 532*a* so as to be positioned at the end portion of the connection conductor 532*b*. The area of the fourth reinforcing member 574B in the XY plane may be an area capable of covering the end portions of the connection conductors 532*b* on the Z-axis positive direction side included in the conductor set 532. The area of the fourth reinforcing member 574B in the XY plane may be smaller than the area of the connection portion 532*a* in the XY plane. The shape of the fourth reinforcing member 574B may depend on the arrangement of the connection conductors 532*b* in the conductor set 532 in the XY plane. The material and the thickness in the Z direction of the fourth reinforcing member 574B may be selected as appropriate in consideration of a stress applied to the conductor set 532.

The fourth reinforcing member 574B being located in the conductor set 532 may reduce the likelihood of the connection conductor 532*b* breaking, similar to the third reinforcing member 573A. The fourth reinforcing member 574B being located on the connection portion 532*a* so as to be positioned at the end portion of the connection conductor

532*b* may further reduce the likelihood of the connection conductor 532*b* breaking, similar to the fourth reinforcing member 574B.

In a case that the circuit substrate 90 is located on the Z-axis negative direction side of the antenna 510 similar to the configuration illustrated in FIG. 4, the fourth reinforcing member 574B may be located to overlap the connecting part 80 in the XY plane. The fourth reinforcing member 574B may be located to cover the opening portion 35*a*. Similar to the configuration illustrated in FIG. 4, the fourth reinforcing member 574B being located to overlap the connecting part 80 in the XY plane may reduce the degree of deformation of the connecting part 80 and the solder 95 and reduce the likelihood of the connecting part 80 and the solder 95 breaking. However, the fourth reinforcing member 574B need not be located above the connecting part 180 in the case that the antenna 510 includes the connecting part 180 instead of the connecting part 80, similar to the configuration illustrated in FIG. 8.

Other configurations and effects of the antenna 510 are the same or similar to the antenna 10 as illustrated in FIG. 1.

Figure 11:
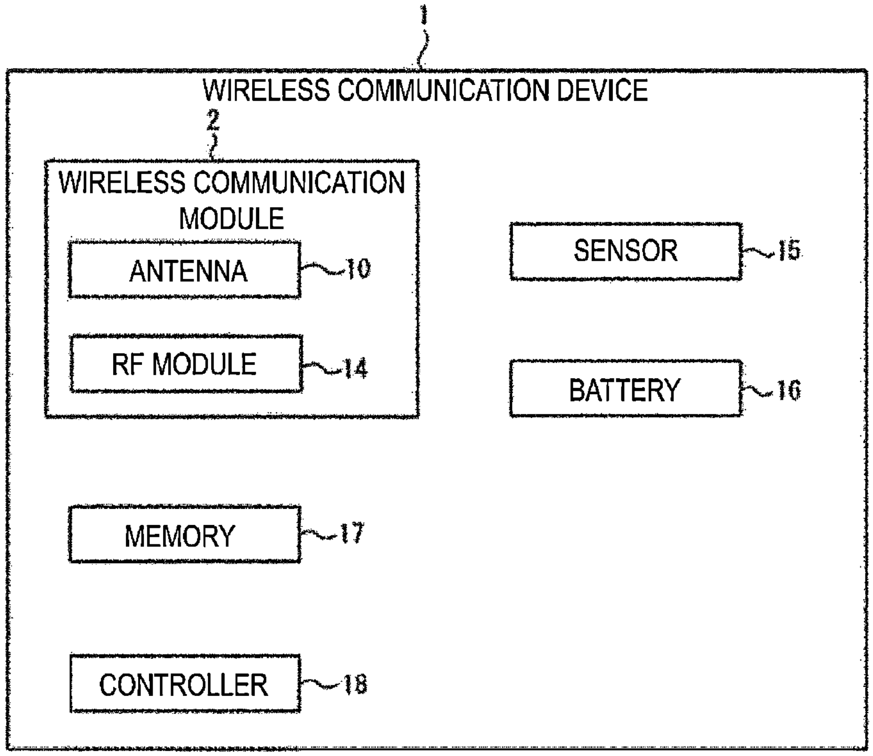
FIG. 11 is a block diagram of a wireless communication device according to an embodiment of the present disclosure.

FIG. 11 is a block diagram of a wireless communication device 1 according to an embodiment of the present disclosure. FIG. 12 is a cross-sectional view of the wireless communication device 1 illustrated in FIG. 11.

As illustrated in FIG. 11, the wireless communication device 1 includes a wireless communication module 2, a sensor 15, a battery 16, a memory 17, and a controller 18. The wireless communication module 2 includes the antenna 10 and an RF module 14. As illustrated in FIG. 12, the wireless communication device 1 includes a housing 11 and a housing 12, and the circuit substrate 90. However, the wireless communication module 2 may include any of the antennas 110 to 510 instead of the antenna 10. The wireless communication device 1 may include the circuit substrate 190 instead of the circuit substrate 90.

As illustrated in FIG. 12, the antenna 10 is located over the circuit substrate 90. The power supply line 60 of the antenna 10 is configured to be electrically connected to the RF module 14 via the connecting part 80 and the circuit substrate 90. The fourth conductor 50 of the antenna 10 may be configured to be electrically connected to the ground conductor 91 of the circuit substrate 90.

The ground conductor 91 may extend along the XY plane. In the XY plane, the area of the ground conductor 91 is greater than the area of the fourth conductor 50 of the antenna 10. The length of the ground conductor 91 along the Y direction is longer than the length of the fourth conductor 50 of the antenna 10 along the Y direction. The length of the ground conductor 91 along the X direction is longer than the length of the fourth conductor 50 of the antenna 10 along the X direction. The antenna 10 may be located closer to an end side than the center of the ground conductor 91 in the X direction. The center of the antenna 10 may be different from the center of the ground conductor 91 in the XY plane. The location where the power supply line 60 is electrically connected to the third conductor 40 may be different from the center of the ground conductor 91 in the XY plane.

In the antenna 10 at a predetermined frequency, a loop current may be generated that flows in a loop through the first conductor 30, the second conductor 33, the third conductor 40, and the fourth conductor 50. The antenna 10 being located closer to the end side than the center of the ground conductor 91 in the X direction allows a current path flowing through the ground conductor 91 to be asymmetric. The current path flowing through the ground conductor 91 being asymmetric allows an antenna structure including the antenna 10 and the ground conductor 91 to have an increased polarization component in the X direction of radiation waves. The polarization component in the X direction of the radiation waves being increased allows the radiation waves to be improved in terms of total radiation efficiency.

The housing 11 may extend along the XY plane. The housing 11 is configured to support other devices. The housing 11 may be configured to support the wireless communication device 1. The components of the wireless communication device 1 are located on an upper surface 11*a* of the housing 11. The housing 11 may be configured to support the battery 16. The battery 16 is located on the upper surface 11*a* of the housing 11. On the upper surface 11*a* of the housing 11, the circuit substrate 90 and the battery 16 may be aligned in the X direction. The first connection conductor 31 of the antenna 10 is located between the battery 16 and the third conductor 40 of the antenna 10. The battery 16 is located on an opposite side of the first connection conductor 31 with respect to the third conductor 40 of the antenna 10.

The housing 12 may cover other devices. The housing 12 includes a lower surface 12*a* facing the antenna 10. The lower surface 12*a* extends along the XY plane. The lower surface 12*a* is not limited to a flat surface, but may include recesses and protrusions. The housing 12 may include a conductive member 13. The conductive member 13 may be located on the lower surface 12*a*. The conductive member 13 may be located inside, on at least one of an outer side and an inner side, of the housing 12. The conductive member 13 may be located at least on an upper surface and a side surface of the housing 12.

The conductive member 13 faces the antenna 10. The antenna 10 is configured to be coupled with the conductive member 13 to be able to radiate electromagnetic waves by using the conductive member 13 as a secondary emitter. The antenna 10 and the conductive member 13 facing each other may result in a large capacitive coupling between the antenna 10 and the conductive member 13. When a current direction of the antenna 10 is aligned with the extending direction of the conductive member 13, a large electromagnetic coupling may occur between the antenna 10 and the conductive member 13. This coupling may function as mutual inductance.

Figure 13:
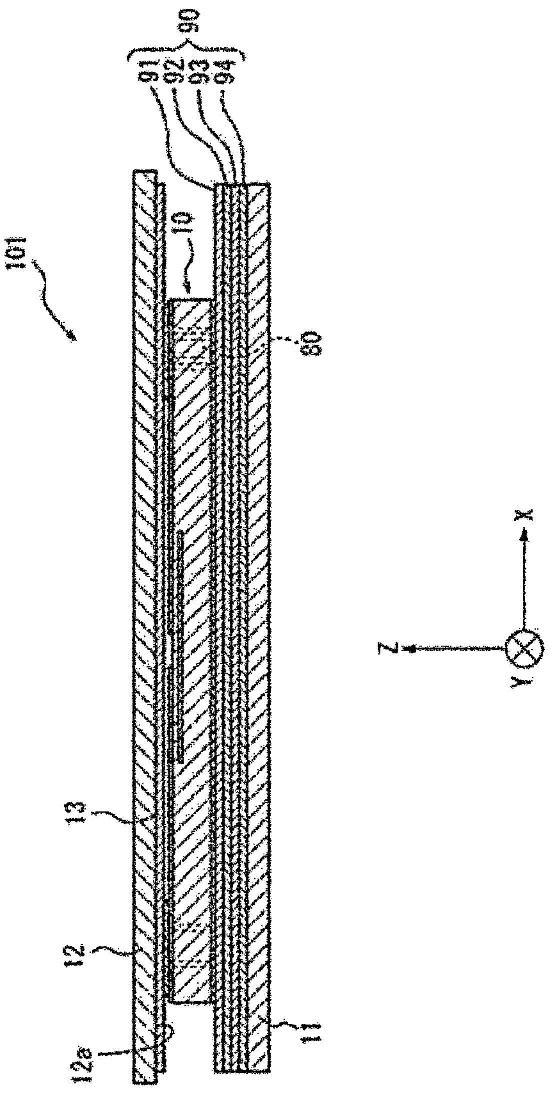
FIG. 13 is a cross-sectional view of a wireless communication device according to another embodiment of the present disclosure.

However, as illustrated in FIG. 13, the conductive member 13 as the secondary emitter may be in contact with the antenna 10. FIG. 13 is a cross-sectional view of a wireless communication device 101 according to another embodiment of the present disclosure. In the configuration illustrated in FIG. 13, the conductive member 13 as the secondary emitter may be integrally formed with the antenna 10.

In FIG. 11, the RF module 14 may be configured to control power supplied to the antenna 10. The RF module 14 is configured to modulate a baseband signal and supply the resultant signal to the antenna 10. The RF module 14 may be configured to modulate an electrical signal received by the antenna 10 into a baseband signal.

The antenna 10 has a small change in the resonant frequency due to the conductor on the circuit substrate 90 side. The wireless communication device 1 being provided with the antenna 10 may reduce the effects received from an external environment.

Examples of the sensor 15 may include a velocity sensor, a vibration sensor, an acceleration sensor, a gyroscopic sensor, a rotation angle sensor, an angular velocity sensor, a geomagnetic sensor, a magnet sensor, a temperature sensor, a humidity sensor, an air pressure sensor, an optical sensor, an illuminance sensor, a UV sensor, a gas sensor, a gas concentration sensor, an atmosphere sensor, a level sensor, an odor sensor, a pressure sensor, a pneumatic sensor, a contact sensor, a wind sensor, an infrared sensor, a motion sensor, a displacement sensor, an image sensor, a weight sensor, a smoke sensor, a leakage sensor, a vital sensor, a battery level sensor, an ultrasound sensor, and a Global Positioning System (GPS) signal receiver.

The battery 16 is configured to supply power to the wireless communication device 1. The battery 16 may be configured to supply power to at least one of the sensor 15, the memory 17, and the controller 18. The battery 16 may include at least one of a primary battery and a secondary battery. A negative pole of the battery 16 is configured to be electrically connected to a ground terminal of the circuit substrate 90. The negative pole of the battery 16 is configured to be electrically connected to the fourth conductor 50 of the antenna 10.

The memory 17 may include, for example, a semiconductor memory. The memory 17 may be configured to function as a work memory for the controller 18. The memory 17 may be included in the controller 18. The memory 17 stores programs describing processing contents for implementing the functions of the wireless communication device 1, information used for processing in the wireless communication device 1, and the like.

The controller 18 may include a processor, for example. The controller 18 may include one or more processors. The processor may include a general-purpose processor that reads a specific program in order to execute a specific function, and a dedicated processor dedicated to specific processing. A dedicated processor may include an application-specific IC. The application-specific IC is also referred to as an Application Specific Integrated Circuit (ASIC). The processor may include a programmable logic device. The programmable logic device is also called a Programmable Logic Device (PLD). The PLD may include a Field-Programmable Gate Array (FPGA). The controller 18 may be any of a System-on-a-Chip (SoC) and a System In a Package (SiP) in which one or a plurality of processors cooperate. The controller 18 may store, in the memory 17, various types of information or programs and the like for causing the components of the wireless communication device 1 to operate.

The controller 18 is configured to generate a transmission signal to be transmitted from the wireless communication device 1. The controller 18 may be configured to obtain measurement data from the sensor 15, for example. The controller 18 may be configured to generate the transmission signal based on the measurement data. The controller 18 may be configured to transmit a baseband signal to the RF module 14 of the wireless communication device 1.

The configurations according to the present disclosure are not limited only to the embodiments described above, and some variations or changes can be made. For example, the functions and the like included in each of the components and the like can be rearranged as long as they are logically consistent, and a plurality of components or the like can be combined into one or divided.

The drawings for describing the configuration according to the present disclosure are schematic. The dimensional proportions and the like in the drawings do not necessarily coincide with the actual values.

In the present disclosure, the descriptions of "first", "second", "third", and the like are examples of identifiers for distinguishing the configurations. Configurations distinguished by "first" and "second" or other descriptions in the present disclosure may exchange numbers in the relevant configuration For example, the first conductor can exchange the identifiers "first" and "second" with the second conductor. The identifiers are exchanged simultaneously. The configurations are distinguished after the identifiers are exchanged. The identifiers may be deleted. Configurations with deleted identifiers are distinguished by reference sign. No interpretation on the order of the configurations, no grounds for the presence of an identifier of a lower value, and no grounds for the presence of an identifier of a higher value shall be given based solely on the description of identifiers such as "first" and "second" in the present disclosure.

REFERENCE SIGNS LIST

1, 101 Wireless communication device
2 Wireless communication module
10, 110, 210, 310, 410, 510 Antenna
11, 12 Housing
11*a* Upper surface
12*a* Lower surface
13 Conductive member
14 RF module
15 Sensor
16 Battery
17 Memory
18 Controller
20 Base
21 Upper surface
22 Lower surface
30, 230, 430 First conductor
31 First connection conductor
32, 432 First electrical conductor layer
33, 233, 433 Second conductor
34 Second connection conductor
35, 435 Second electrical conductor layer
35*a* Opening portion
40, 440 Third conductor
41, 441 Fifth conductor
42, 442 Sixth conductor
43 Inner conductor
50 Fourth conductor
60 Power supply line
70, 170, 270, 370, 570 Reinforcing member
71, 271, 571 First reinforcing member
72, 172, 272, 372, 572 Second reinforcing member
80, 180 Connecting part
90, 190 Circuit substrate
91 Ground conductor
92, 93, 94B, 191, 192, 193B Insulating layer
94, 193 Wiring layer
94A, 193A Wiring pattern
95, 194 Solder
231, 231A, 231B First connection conductor set
234, 234A, 234B Second connection conductor set
273, 273A, 273B, 573A, 573B Third reinforcing member
274, 274A, 274B, 374B, 574A, 574B Fourth reinforcing member
432*a*, 435*a*, 441*a*, 442*a* Cut portion
530, 531, 532, 533 Conductor set
530*a*, 531*a*, 532*a*, 533*a* Connection portion
530*b*, 531*b*, 532*b*, 533*b* Connection conductor
540, 541, 542, 543 Radiation conductor
544 Inner conductor

The invention claimed is:

1. An antenna comprising:

a first conductor;

a second conductor facing the first conductor in a first direction;

a third conductor extending along the first direction, located between the first conductor and the second conductor, and configured to capacitively connect the first conductor and the second conductor to each other;

a fourth conductor extending along the first direction and configured to be electrically connected to the first conductor and the second conductor;

a power supply line configured to be electromagnetically connected to the third conductor; and a reinforcing member comprising a dielectric material and located on at least a portion of any of the first conductor and the second conductor.

2. The antenna according to claim 1, wherein the first conductor comprises a first electrical conductor layer configured to be electrically connected to the third conductor, and a first connection conductor extending along a second direction intersecting the first direction from the fourth conductor to the first electrical conductor layer, and the reinforcing member comprises a first reinforcing member located on the first electrical conductor layer and positioned at an end portion of the first connection conductor.

3. The antenna according to claim 2, wherein the second conductor comprises a second electrical conductor layer configured to be electrically connected to the third conductor, and a second connection conductor extending along the second direction from the fourth conductor to the second electrical conductor layer, and the reinforcing member comprises a second reinforcing member located on the second electrical conductor layer and positioned at an end portion of the second connection conductor.

4. The antenna according to claim 3, further comprising:

a connecting part aligned with the second connection conductor in a third direction intersecting a first plane comprising the first direction and the second direction, wherein the second reinforcing member is located to overlap the connecting part in a second plane comprising the first direction and the third direction.

5. The antenna according to claim 3, further comprising:

two first connection conductor sets comprising at least one first connection conductor being the first connection conductor, the two first connection conductor sets being separate from each other by a first interval in a third direction intersecting the first plane comprising the first direction and the second direction, wherein the first reinforcing member comprises two third reinforcing members respectively located on the two first connection conductor sets.

6. The antenna according to claim 5, further comprising:

two second connection conductor sets comprising at least one second connection conductor being the second connection conductor, the two second connection conductor sets being separate from each other by a second interval in the third direction intersecting the first plane comprising the first direction and the second direction, wherein the second reinforcing member comprises two fourth reinforcing members respectively located on the two second connection conductor sets.

7. The antenna according to claim 6, wherein the first electrical conductor layer and the second electrical conductor layer comprise a cut portion located near a center of the antenna in the third direction, and the third conductor comprises a cut portion connected to the cut portion.

8. An antenna comprising:

four radiation conductors extending along a second plane, and separate from each other in a first direction and a third direction comprised in the second plane;

a fourth conductor extending along the second plane, and separate from the four radiation conductors in a second direction intersecting the second plane;

four conductor sets, each of the conductor sets comprising at least one connection conductor extending along the second direction from the fourth conductor;

a power supply line configured to be electromagnetically connected to any of the four radiation conductors; and a reinforcing member comprising a dielectric material and located on at least a portion of any of the four conductor sets, wherein the four conductor sets are configured to be electrically connected to the four radiation conductors, respectively, among the connection conductors comprised in the four conductor sets, any two connection conductors are parts of a first connection pair aligned along the first direction, and any two connection conductors are parts of a second connection pair aligned along the third direction, and the antenna is configured to resonate at a first frequency along a first current path comprising the fourth conductor, the four radiation conductors, and the first connection pair, and resonate at a second frequency along a second current path comprising the fourth conductor, the four radiation conductors, and the second connection pair.

9. The antenna according to claim 8, further comprising a connecting part aligned with the connection conductor in the third direction, wherein the reinforcing member is located to overlap the connecting part in the second plane.

10. The antenna according to claim 1, wherein the antenna is configured as a flexible printed circuit.

11. A wireless communication module comprising:

the antenna according to claim 1; and an RF module configured to be electrically connected to the power supply line.

12. A wireless communication device comprising:

the wireless communication module according to claim 11; and a battery configured to supply power to the wireless communication module.

13. The antenna according to claim 1, further comprising at least one connection conductor extending along a second direction from the fourth conductor to at least a part of at least one of the first conductor or the second conductor on which the reinforcing member is located.

* * * * *